(12) United States Patent  
Shibukawa

(10) Patent No.: US 7,671,494 B2
(45) Date of Patent: Mar. 2, 2010

(54) MOTOR/GENERATOR

(75) Inventor: Yuichi Shibukawa, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 316 days.

(21) Appl. No.: 11/673,641

(22) Filed: Feb. 12, 2007

(65) Prior Publication Data

US 2007/0188036 A1 Aug. 16, 2007

(30) Foreign Application Priority Data

Feb. 14, 2006 (JP) .............................. 2006-037075
Feb. 8, 2007 (JP) .............................. 2007-029664

(51) Int. Cl.
*H02K 7/00* (2006.01)
(52) U.S. Cl. ..................................... 310/67 R; 310/190
(58) Field of Classification Search ............... 310/67 R, 310/190, 191, 112, 113, 114
See application file for complete search history.

(56) References Cited

U.S. PATENT DOCUMENTS

| | | | |
|---|---|---|---|
| 6,049,152 A | 4/2000 | Nakano | |
| 6,462,430 B1 * | 10/2002 | Joong et al. ................ | 290/40 C |
| 6,563,246 B1 * | 5/2003 | Kajiura et al. .............. | 310/162 |
| 6,774,591 B2 * | 8/2004 | Arimitsu et al. ............. | 318/154 |
| 2002/0047418 A1 * | 4/2002 | Seguchi et al. .............. | 310/114 |
| 2003/0090167 A1 | 5/2003 | Kajiura et al. | |
| 2003/0102756 A1 | 6/2003 | Kusase | |
| 2006/0082238 A1 | 4/2006 | Kusase et al. | |
| 2006/0192518 A1 | 8/2006 | Adra et al. | |

FOREIGN PATENT DOCUMENTS

| | | |
|---|---|---|
| EP | 0447257 A2 | 9/1991 |
| JP | H07-143694 A | 6/1995 |
| JP | 2001-119875 A | 4/2001 |
| JP | 2001-314053 | 11/2001 |

* cited by examiner

*Primary Examiner*—Nguyen N Hanh
(74) *Attorney, Agent, or Firm*—Global IP Counselors, LLP

(57) ABSTRACT

A motor/generator includes a rotor member, a shorting member and a stator. The rotor member has a plurality of permanent magnets. The shorting member is configured and arranged to selectively establish a short-circuit in magnetic flux of the permanent magnets to switch between a normal state in which the magnetic flux is not shorted and a shorted state in which the magnetic flux is shorted. The stator has a plurality of coils configured and arranged to be energized with a composite electrical current including first and second current components. The stator is further configured and arranged to form a first magnetic circuit between the coils and the permanent magnets with the first current component to drive the rotor member and to form a second magnetic circuit between the coils and the shorting member with the second current component to selectively switch between the normal state and the shorted state.

14 Claims, 10 Drawing Sheets

MOTOR/GENERATOR

CROSS-REFERENCE TO RELATED APPLICATIONS

This application claims priority to Japanese Patent Application Nos. 2006-037075, filed on Feb. 14, 2006 and 2007-029664, filed on Feb. 8, 2007. The entire disclosures of Japanese Patent Application No. 2006-037075 and 2007-029664 are hereby incorporated herein by reference.

BACKGROUND OF THE INVENTION

1. Field of the Invention

The present invention relates to a motor/generator in which the induced voltage of the motor/generator is reduced. More specifically, the present invention relates to a motor/generator in which the magnetic flux flowing in a magnetic circuit that is formed between a rotor and a stator of the motor/generator is reduced by shorting the magnetic flux of permanent magnets of the motor/generator.

2. Background Information

Japanese Laid-Open Patent Publication No. 2001-314053 discloses a conventional permanent magnet motor/generator provided. The conventional motor/generator disclosed in this reference is configured to short the magnetic flux of the permanent magnets when the induced voltage becomes high while a rotor rotates at high speeds. Such conventional motor/generator includes the rotor having a plurality of permanent magnets, a plurality of coils through which the electric current passes, a stator configured and arranged to drive the rotor by forming a magnetic circuit between the coils and the permanent magnets, and a shorting member. The shorting member is configured and arranged to switch between a shorted state in which the shorting member establishes a short-circuit in the magnetic flux of the permanent magnets and a normal state in which the shorting member does not establish a short-circuit in the magnetic flux. In the conventional motor/generator, an actuator is provided to drive the shorting member to switch between the shorted state and the normal state.

in view of the above, it will be apparent to those skilled in the art from this disclosure that there exists a need for an improved motor/generator. This invention addresses this need in the art as well as other needs, which will become apparent to those skilled in the art from this disclosure.

SUMMARY OF THE INVENTION

With the conventional motor/generator disclosed in the above mentioned reference, the size of the motor/generator tends to be relatively large because it is necessary to provide a separate actuator to operate the shorting member in order to switch between the shorted state and the normal state.

Accordingly, one object of the present invention is to provide a motor/generator that can establish a short-circuit in the magnetic flux of the permanent magnets without the need to provide a separate actuator.

In order to achieve the object of the present invention, a motor/generator includes a rotor member, a shorting member and a stator. The rotor member has a plurality of permanent magnets. The shorting member is configured and arranged to selectively establish a short-circuit in magnetic flux of the permanent magnets of the rotor member to switch between a normal state in which the magnetic flux of the permanent magnets is not shorted and a shorted state in which the magnetic flux of the permanent magnets is shorted. The stator has a plurality of coils configured and arranged to be energized with a composite electrical current including first and second current components. The stator is further configured and arranged to form a first magnetic circuit between the coils and the permanent magnets of the rotor member with the first current component of the composite electrical current to drive the rotor member and to form a second magnetic circuit between the coils and the shorting member with the second current component of the composite electrical current to selectively switch between the normal state and the shorted state.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1A:
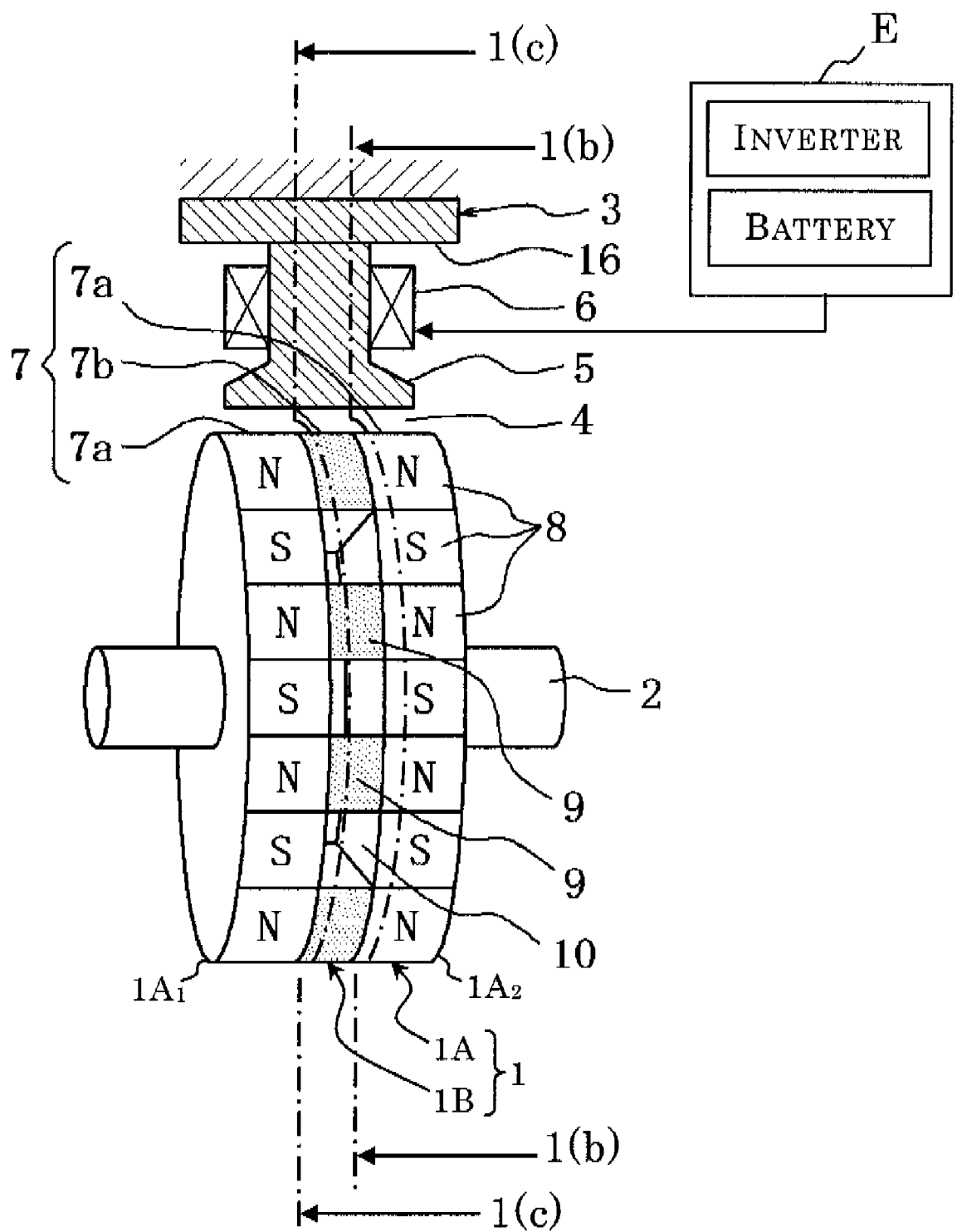
FIG. 1(a) is a simplified schematic view illustrating a structure of a motor/generator in accordance with a first embodiment of the present invention.

Referring initially to FIG. 1(a), a motor/generator is illustrated in accordance with a first embodiment of the present invention. FIG. 1(a) is a simplified schematic view illustrating a structure of the motor/generator in accordance with the first embodiment.

As seen in FIG. 1(a), the motor/generator of the first embodiment includes a rotor unit 1, a rotary shaft 2 and a stator 3. In the first embodiment, the motor/generator is arranged as a radial gap structure in which the rotor unit 1 and the stator 3 are arranged radially relative to each other such that a radial gap 4 (radial air gap) is formed between the rotor unit 1 and the stator 3. More specifically, in the first embodiment, the rotor unit 1 and the stator 3 are formed in generally cylindrical shapes. The rotor unit 1 and the stator 3 are coaxially arranged so that the rotor unit 1 is disposed radially inward of the stator 3.

As shown in FIG. 1(a), the rotor unit 1 includes a drive rotor member 1A (rotor member) and a shorting rotor member 1B (shorting member). The drive rotor member 1A has a plurality of permanent magnets 8 disposed on the circumferential surface of the drive rotor member 1A. As shown in FIG. 1(a), the drive rotor member 1A further comprises a first drive rotor section $1A_1$ (first rotor section) and a second drive rotor section $1A_2$ (second rotor section). The shorting rotor member 1B is configured and arranged to selectively establish a short-circuit in the magnetic flux of the permanent magnets 8 of the drive rotor member 1A.

As will be described in more detail later, the drive rotor member 1A and the shorting rotor member 1B are configured and arranged to rotate at the same speed (as an integral unit) during normal conditions such that the same phase (i.e., the relative positions between the drive rotor member 1A and the shorting rotor member 1B in the rotational direction) is maintained between the drive rotor member 1A and the shorting rotor member 1B. When a prescribed condition is met, a rotational speed difference occurs momentarily between the drive rotor member 1A and the shorting rotor member 1B such that a prescribed phase difference (relative displacement) develops between the drive rotor member 1A and the shorting rotor member 1B. In other words, the shorting rotor member 1B is driven to rotate by a prescribed amount relative to the drive rotor member 1A. After the relative rotation between the drive rotor member 1A and the shorting rotor member 1B occurs, the drive rotor member 1A and the shorting rotor member 1B are configured and arranged to rotate again as an integral unit but with the prescribed phase difference between the drive rotor member 1A and the shorting rotor member 1B.

As shown in FIG. 1(a), the rotor unit 1 is arranged as a thick circular disc. The rotary shaft 2 is provided in the center portions of both axial sides of the rotor unit 1. Both ends of the rotor rotary shaft 2 are rotatably supported on bearings (not shown).

The stator 3 is arranged radially outward of the rotor unit 1 such that the radial gap 4 exists between stator 3 disposed on the outside and the rotor unit 1 disposed on the inside. In other words, as mentioned above, the motor/generator of the first embodiment has a radial gap structure. The stator 3 has a stator core 16 having the shape of a hollow cylinder, and a plurality of tooth sections 5 arranged at equal intervals (i.e., with equal spacing) along the circumferential direction. The tooth sections 5 are arranged on the internal surface of the stator core 16 to protrude radially inwardly. FIG. 1(a) shows one of the tooth sections 5 in a cross sectional view. As shown in FIG. 1(a), a tip end of each of the tooth sections 5 is widened and points toward the rotor unit 1. A coil 6 is wound around the perimeter of each of the tooth sections 5, which protrudes in the radial direction.

The rotor unit 1 has a circumferential surface 7 that faces toward the stator 3 (more specifically, the tooth sections 5 of the stator 3) across the radial gap 4. More specifically, the circumferential surface 7 includes a pair of gap surfaces 7a that form circumferential surfaces of the first and second drive rotor sections $1A_1$ and $1A_2$ of the drive rotor member 1A and a gap surface 7b that forms a circumferential surface of the shorting rotor member 1B. As shown in FIG. 1(a), the permanent magnets 8 of the rotor unit 1 are arranged on the gap surfaces 7a of the first and second drive rotor sections $1A_1$ and $1A_2$.

As shown in FIG. 1(a), the shorting rotor member 1B is arranged as an annular body disposed in a center portion the rotor unit 1 in the axial direction. Each of the first and second drive rotor sections $1A_1$ and $1A_2$ is arranged as a generally circular disc-shaped member. In the first embodiment, the shorting rotor member 1B is disposed between the first and second drive rotor sections $1A_1$ and $1A_2$ in the axial direction. More specifically, the first and second drive rotor sections $1A_1$ and $1A_2$ are arranged on both axially facing sides of the shorting rotor member 1B such that the gap surfaces 7a (circumferential surfaces) of the first and second drive rotor sections $1A_1$ and $1A_2$ and the gap surface $7b$ (circumferential surface) of the shorting rotor member 1B face toward the radial gap 4.

As mentioned previously, the permanent magnets 8 are provided on the gap surfaces $7a$ of the first and second drive rotor sections $1A_1$ and $1A_2$ of the drive rotor member 1A. In each of the first and second drive rotor sections $1A_1$ and $1A_2$, the permanent magnets 8 are arranged such that adjacent permanent magnets 8 have opposite magnetic poles facing radially outwardly. In other words, the N poles of alternating permanent magnets 8 are oriented radially outward and the S poles of alternating adjacent permanent magnets 8 are oriented radially outward. When the drive rotor member 1A is viewed in the axial direction, the permanent magnets 8 of the first drive rotor section $1A_1$ and the permanent magnets 8 of the second drive rotor section $1A_2$ are arranged such that the same magnetic poles (i.e., the N poles or the S poles) are aligned with each other as shown in FIG. 1(a).

Figure 2:
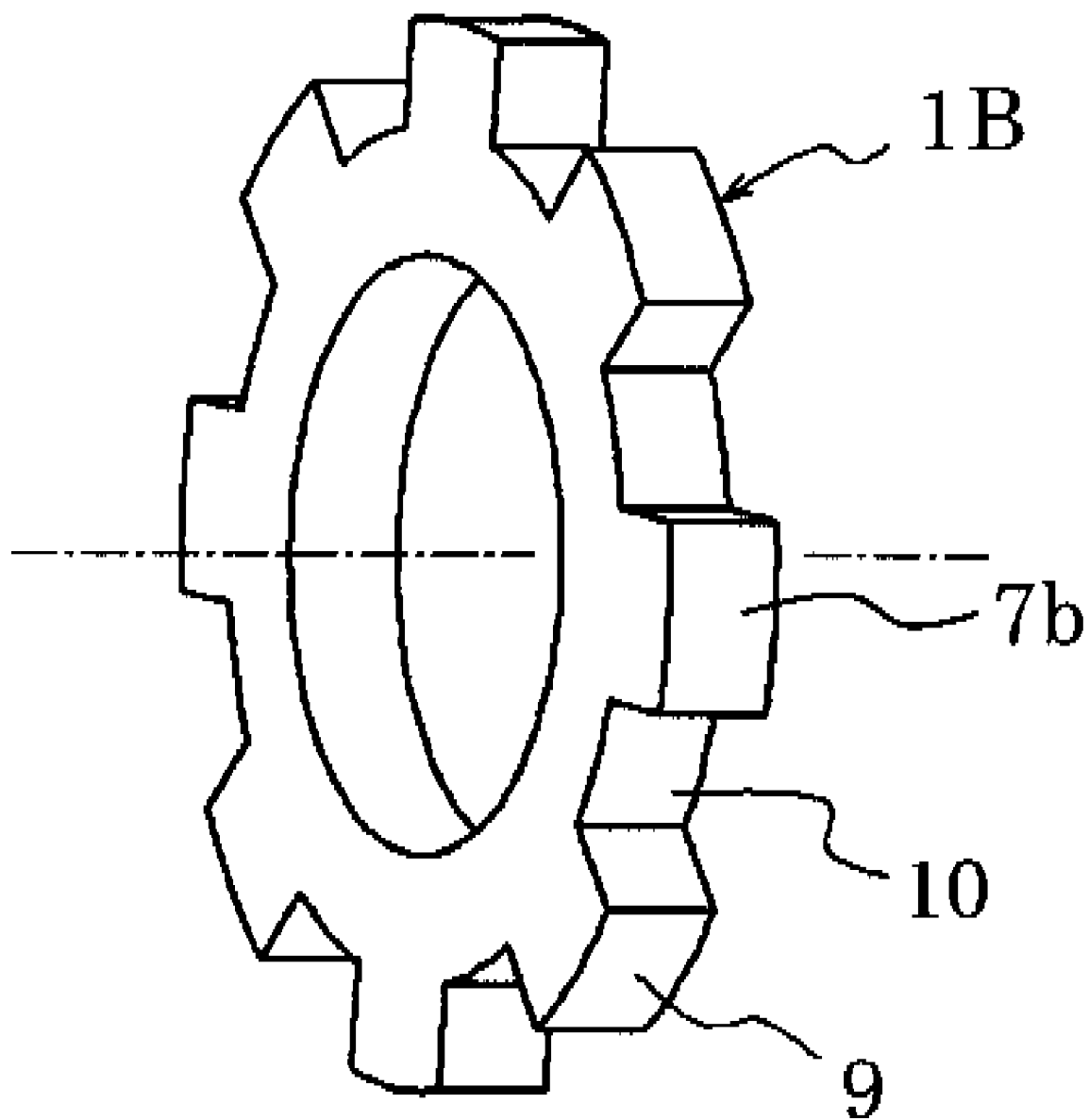
FIG. 2 is a simplified perspective view of a shorting rotor member of the motor/generator in accordance with the first embodiment of the present invention.

FIG. 2 is a simplified perspective view of the shorting rotor member 1B. As shown in FIG. 2, the gap surface $7b$ of the shorting rotor member B is arranged to form a plurality of a plurality of protruding poles 9 (magnetic pole sections) and a recess portions 10 disposed between the protruding poles 9. The protruding poles 9 are equally spaced apart in the circumferential direction of the shorting rotor member 1B as shown in FIG. 2. In the first embodiment of the present invention, the protruding poles 9 extend generally radially outwardly from the recess portions 10. Since the shorting rotor member 1B is made of a magnetic material, the protruding poles 9 are also made of a magnetic material. An empty space is formed in each of the recess portions 10 between the adjacent protruding poles 9. In other words, the shorting rotor member 1B has a toothed gear shape including the protruding poles 9 and the recess portions 10 alternately arranged along the gap surface $7b$.

As shown in FIG. 2, the protruding poles 9 and the recess portions 10 of the shorting rotor member 1B are arranged alternately along the circumferential direction. In the first embodiment, the shorting rotor member 1B preferably includes a total of eight protruding poles 9 and eight recess portions 10 around the entire circumference thereof. The circumferential length of each of the protruding poles 9 is preferably the same as the circumferential length of each of the recess portions 10.

On the other hand, each of the first and second drive rotor sections $1A_1$ and $1A_2$ of the drive rotor member 1A includes a total of sixteen permanent magnets 8 arranged around the circumference thereof. In other words, each of the first and second drive rotor sections $1A_1$ and $1A_2$ of the drive rotor member 1A of the drive rotor member 1A includes the permanent magnets 8 that is twice the number of the protruding poles 9 (or the recess portions 10) of the shorting rotor member 1B. As shown in FIG. 1(a), the circumferential length of each of the permanent magnets 8 of the drive rotor member 1A is preferably the same as the circumferential length of each of the protruding poles 9 (and of the recess portions 10) of the shorting rotor member 1B.

Figure 3:
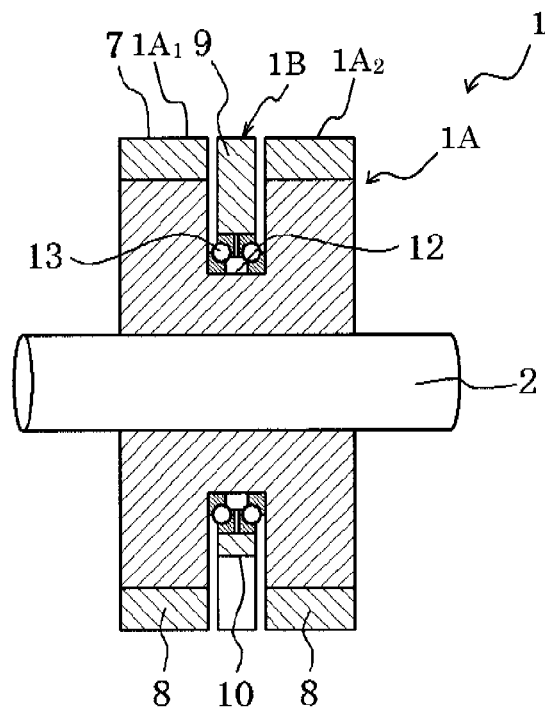
FIG. 3 is a simplified vertical cross sectional view of a rotor unit of the motor/generator as taken along a plane that is substantially parallel to an axis of a rotary shaft in accordance with the first embodiment of the present invention.

FIG. 3 is a vertical cross sectional view of the rotor unit 1 as taken along a plane that is substantially parallel to the rotary shaft 2. As shown in FIG. 3, the rotary shaft 2 is coupled to the drive rotor member 1A. The circumferential surface 7 of the rotor unit 1 forms a radially inwardly recessed section 12. The recessed section 12 extends around the entire circumference of the drive rotor member 1A and the annular shorting rotor member 1B (FIG. 2) is housed inside the recessed section 12 as shown in FIG. 3.

When the rotor unit 1 is viewed in a radially inward direction from the outside, the first and second drive rotor sections $1A_1$ and $1A_2$ are arranged axially side by side with the shorting rotor member 1B disposed therebetween, as shown in FIG. 1(a). However, in the first embodiment, the first and second drive rotor sections $1A_1$ and $1A_2$ are actually connected together at a radial center portion, as shown in FIG. 3, to form an integral unit. The shorting rotor member 1B is mounted to the recessed section 12 of the drive rotor member 1A on a bearing member 13 such that the shorting rotor member 1B can selectively rotate relative to the drive rotor member 1A.

As shown in the lower portion of FIG. 3, the radial thickness of the permanent magnets 8 of the drive rotor member 1A is smaller than the radial dimension of the spaces formed by the recess portions 10 of the shorting rotor member 1B. Since the radial dimension of the spaces formed by the recess portions 10 is larger than the radial thickness of the permanent magnets 8 of the drive rotor member 1A, the magnetic flux of the permanent magnets 8 can be prevented from leaking to the shorting rotor member 1B when the shorting rotor member 1B is not in the shorted state.

Figure 4:
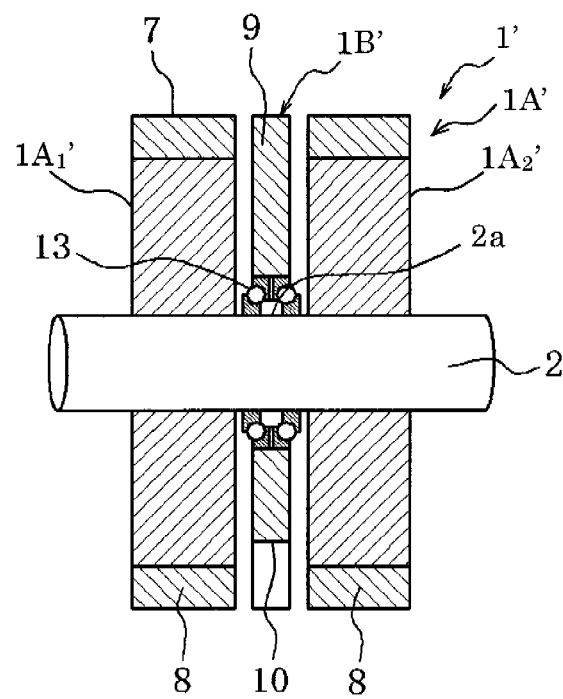
FIG. 4 is a simplified vertical cross sectional view of the rotor unit of the motor/generator with an alternative structure as taken along a plane that is substantially parallel to an axis of a rotary shaft in accordance with the first embodiment of the present invention.

Alternatively, an alternative rotor unit 1' illustrated in FIG. 4 can be used in the motor/generator in accordance with the first embodiment. The alternative rotor unit 1' includes a drive rotor member 1A' having a first drive rotor section $1A_1'$ and a second drive rotor section $1A_2'$ as separate members as shown in FIG. 4. In such case, the first and second drive rotor sections $1A_1'$ and $1A_2'$ are integrally coupled to the rotor rotary shaft 2 so that the first and second drive rotor sections $1A_1'$ and $1A_2'$ rotate as an integral unit. The permanent magnets 8 are mounted on the circumferential surfaces of the first and second drive rotor sections $1A_1'$ and $1A_2'$ as in the first and second drive rotor sections $1A_1$ and $1A_2$ illustrated in FIG. 3. The same operational effects can be achieved with the alternative rotor unit 1' shown in FIG. 4 as with the rotor unit 1 shown in FIG. 3. With the alternative rotor unit 1' shown in FIG. 4, a shorting rotor member 1B' is first mounted to the rotary shaft 2 by the bearing member 13 at a axial center portion $2a$ of the rotary shaft 2. The shorting rotor member 1B' includes the protruding poles 9 and the recess portions 10 similarly to the shorting rotor member 1B. Then, the first and second drive rotor sections $1A_1'$ and $1A_2'$ are fixedly secured to the rotary shaft 2. This alternative structure illustrated in FIG. 4 improves the ease of assembly when the motor/generator is manufactured in accordance with the present invention.

Figure 1B:
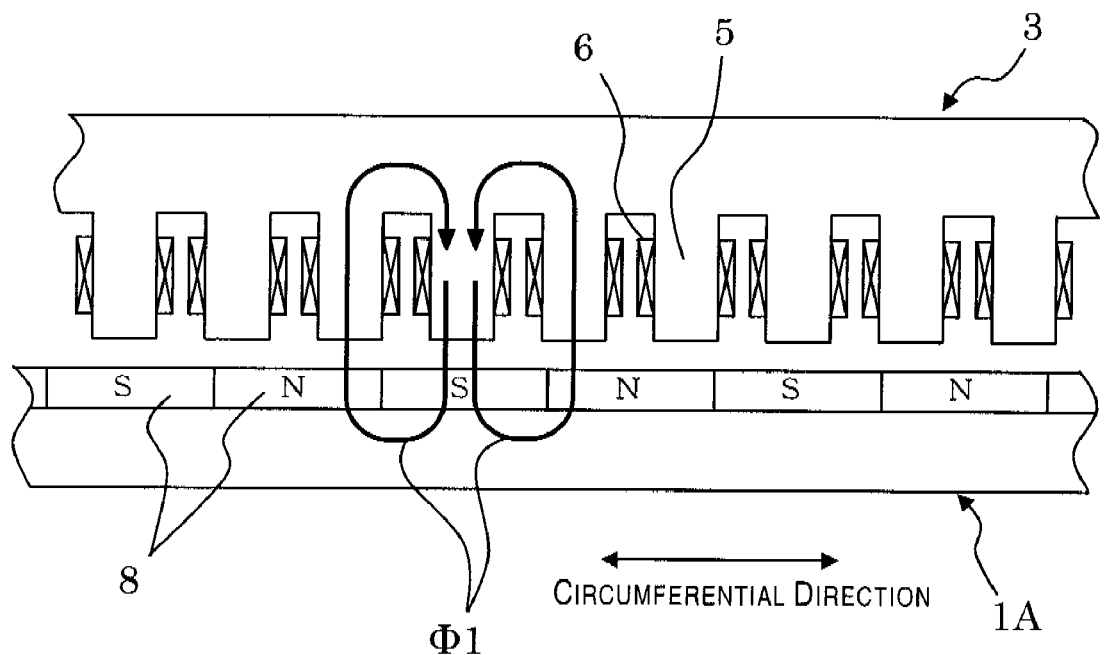
FIG. 1(b) is a diagrammatic partial cross sectional view of the motor/generator in accordance with the first embodiment of the present invention as taken along a section line 1(b)-1(b) of FIG. 1(a) with the circumferential direction of the motor/generator being extended in a generally straight line.
Figure 1C:
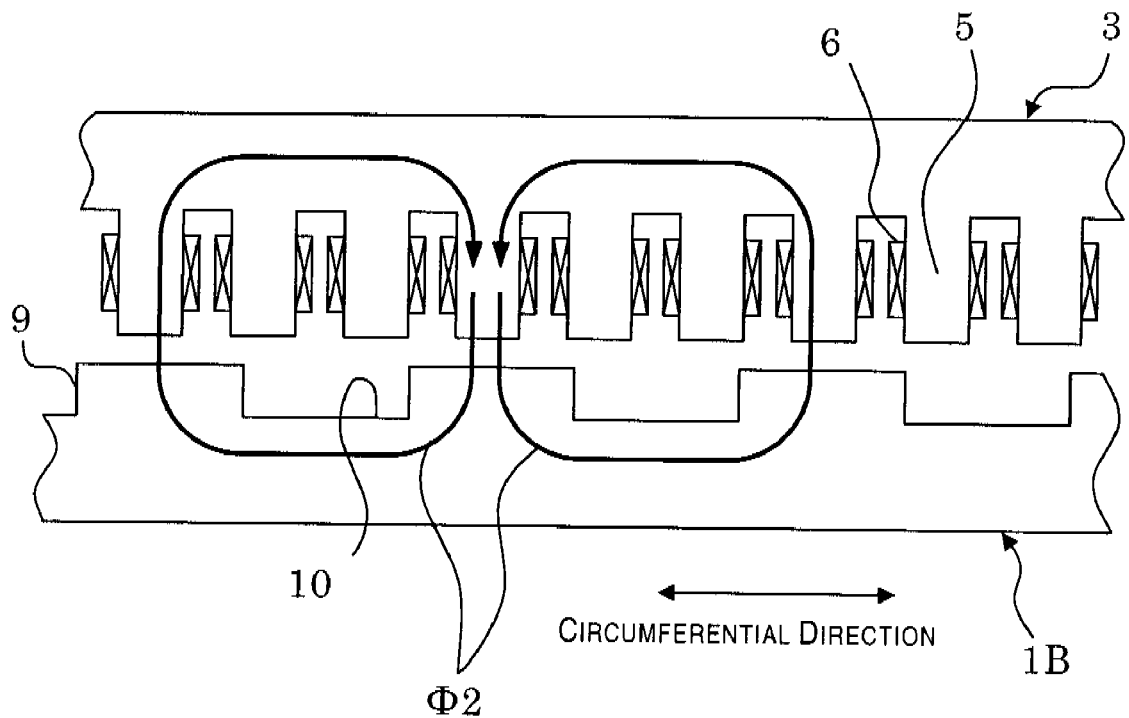
FIG. 1(c) is a diagrammatic partial cross sectional view of the motor/generator in accordance with the first embodiment of the present invention as taken along a section line 1(c)-1(c) of FIG. 1(a) with the circumferential direction of the motor/generator being extended in a generally straight line.

Referring now to FIGS. 1(a) to 1(c), the operation of the motor/generator in accordance with the first embodiment will now be explained. FIG. 1(b) is a diagrammatic partial cross sectional view of the motor/generator in accordance with the first embodiment of the present invention as taken along a section line 1(b)-1(b) of FIG. 1(a) with the circumferential direction of the motor/generator being extended in a generally straight line. FIG. 1(c) is a diagrammatic partial cross sectional view of the motor/generator in accordance with the first embodiment of the present invention as taken along a section line 1(c)-1(c) of FIG. 1(a) with the circumferential direction of the motor/generator being extended in a generally straight line.

In the first embodiment, the drive rotor member 1A and the shorting rotor member 1B are configured and arranged to be selectively driven separately using a composite electrical current that is supplied to the coils 6 of the stator 3. In other words, the drive rotor member 1A and the shorting rotor member 1B can be selectively driven to rotate as an integral unit or to rotate relative to each other.

First, the operation of the drive rotor member 1A will be explained with reference to FIG. 1(b).

The coils 6 wound around the tooth sections 5 are connected to an electric circuit E provided with an inverter and a battery as shown in FIG. 1(a). The electric circuit is configured to supply a composite electrical current to the coils 6. The composite electrical current includes a first current component and a second current component. The first current component of the composite electrical current is configured to generate a magnetic flux passing radially through the tooth sections 5. Thus, when the composite electrical current is supplied to the coils 6, the coil 6 of each of the tooth sections 5 forms an electromagnet and magnetic forces act between the tip portion of the tooth section 5 and the permanent magnets 8 of the drive rotor member 1A. Thus, a first magnetic circuit $\Phi 1$ is formed as shown in FIG. 1(b). More specifically, the magnetic flux passing through a given tooth section 5 passes across the radial gap 4 on the radially inward side of the tooth section 5 and passes through one of the permanent magnets 8 into the inside of the drive rotor member 1A. The magnetic flux then passes through another permanent magnet 8, across the radial gap 4, and into the adjacent tooth section 5. The magnetic flux then passes to the radially outward side the adjacent tooth section 5 and through the stator core 16 to the original tooth section 5 from which the magnetic flux came, thus completing the first magnetic circuit $\Phi 1$.

As a result, a torque is exerted against the drive rotor member 1A to drive (rotate) the drive rotor member 1A. Therefore, the rotor unit 1 including the drive rotor member 1A is also driven and the rotary shaft 2 coupled to the rotor unit 1 rotates in accordance with the torque exerted against the drive rotor member 1A and the external load.

Next, the operation of the shorting rotor member 1B will now be explained with reference to FIG. 1(c).

The second current component of the composite electrical current is configured to generate a magnetic flux passing radially through some of the tooth sections 5. Thus, when the composite electrical current is fed to the coils 6, a magnetic force is generated between the tip portions of the tooth sections 5 (electromagnets) and the protruding poles 9 of the shorting rotor member 1B to form a second magnetic circuit $\Phi 2$ as shown in FIG. 1(c). More specifically, the magnetic flux passing through a given tooth section 5 passes across the radial gap 4 on the radially inward side of the tooth section 5 and passes through one of the protruding poles 9 into the inside of the shorting rotor member 1B. The magnetic flux then passes through the adjacent protruding pole 9, across the radial gap 4, and into another of the tooth sections 5. The magnetic flux then passes to the radially outward side of the other tooth section 5 and through the stator core 16 to the original tooth section 5 from which the magnetic flux came, thus completing the second magnetic circuit $\Phi 2$.

As a result, a torque is exerted against the shorting rotor member 1B to drive (rotate) the shorting rotor member 1B.

The composite electric current that can be used to drive the drive rotor member 1A and the shorting rotor member 1B in the present invention as described above is disclosed in U.S. Pat. No. 6,049,152 assigned to the assignee of the present application. The entire disclosure of U.S. Pat. No. 6,049,152 is hereby incorporated herein by reference.

By using the composite electric current as described previously, the torque exerted against the drive rotor member 1A and the torque exerted against the shorting rotor member 1B can be selectively controlled independently. By controlling these torques such that a torque difference occurs or such that one of the torques goes to zero, the shorting rotor member 1B can be selectively rotated relative to the drive rotor member 1A. For example, when the drive rotor member 1A and the shorting rotor member 1B are driven with the same torque, the drive rotor member 1A and the shorting rotor member 1B rotate together as an integral unit and there is no relative rotation of the shorting rotor member 1B with respect to the drive rotor member 1A. However, if the drive rotor member 1A and the shorting rotor member 1B are driven with different torques, the drive rotor member 1A and the shorting rotor member 1B undergo relative rotation. This relative positioning (relative displacement) between the drive rotor member 1A and the shorting rotor member 1B is used to switch between a normal state in which the magnetic flux of the permanent magnets 8 of the drive rotor member 1A is not shorted and a shorted state in which the magnetic flux of the permanent magnets 8 of the drive rotor member 1A is shorted.

Figure 5:
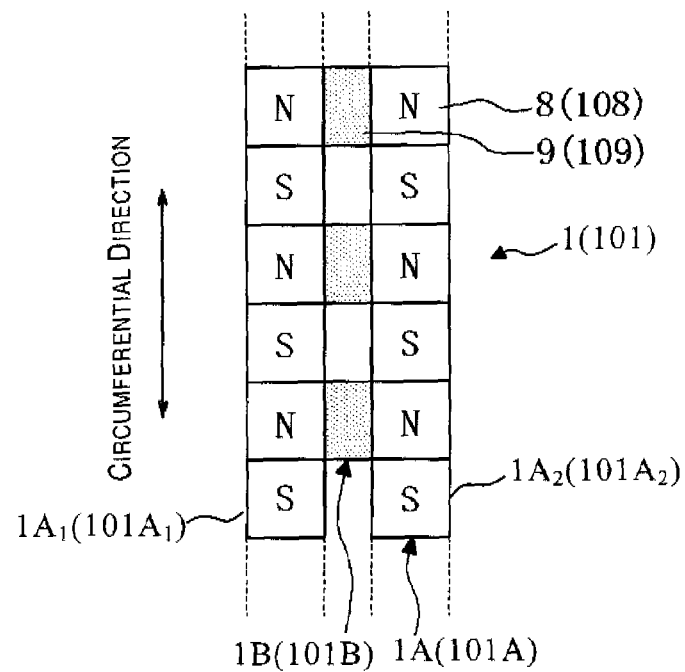
FIG. 5 is a diagrammatic view illustrating the relative positioning of a drive rotor member and the shorting rotor member of the motor/generator in a normal state in which the magnetic flux of the permanent magnets is not shorted with the circumferential direction of the motor/generator being extended into a generally straight line.

FIG. 5 is a diagrammatic view illustrating the relationship of the relative positioning between the driver rotor member 1A and the shorting rotor member 1B in the normal state. FIG. 5 shows the circumferentially arranged permanent magnets 8, the protruding poles 9, and the recess portions 10 with the circumferential direction of the rotor unit 1 being extended into a generally straight line. When the rotational speed of the rotor unit 1 is low, i.e., below a prescribed rotational speed, or when the vehicle conditions require the motor/generator be operated in the normal state, the relative positioning of the drive rotor member 1A and the shorting rotor member 1B is set in the normal state as shown in FIG. 5. Thus, in the normal state as shown in FIG. 5, the protruding poles 9 are positioned such that the protruding poles 9 do not straddle two circumferentially adjacent permanent magnets 8 of each of the first and second drive rotor sections $1A_1$ and $1A_2$. In other words, in the normal state, the circumferential positions of the protruding poles 9 are aligned with the circumferential positions of the permanent magnets 8 so that each of the protruding poles 9 overlaps only one permanent magnet 8 of each of the first and second first drive rotor sections $1A_1$ and $1A_2$ as viewed in the axial direction.

In the normal state shown in FIG. 5, the protruding poles 9 do not straddle two circumferentially adjacent permanent magnets 8 (which have opposite polarities). Therefore, the protruding poles 9 do not short-circuit the magnetic flux of the adjacent permanent magnets 8. Consequently, the magnetic flux of the first magnetic circuit $\Phi 1$ is large and the motor efficiency can be increased in the normal state.

Figure 6:
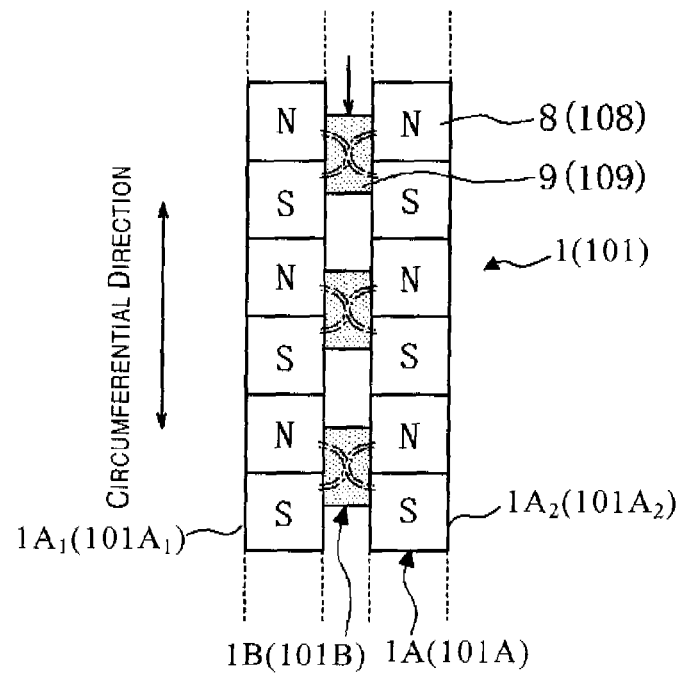
FIG. 6 is a diagrammatic view illustrating the relative positioning of the drive rotor member and the shorting rotor member of the motor/generator in a shorted state in which the magnetic flux of the permanent magnets is shorted with the circumferential direction of the motor/generator being extended into a generally straight line.

FIG. 6 is a diagrammatic view illustrating the relationship of the relative positioning between the driver rotor member 1A and the shorting rotor member 1B in the shorted state. Similarly to FIG. 5, FIG. 6 shows the circumferentially arranged permanent magnets 8, the protruding poles 9, and the recess portions 10 with the circumferential direction extended into a generally straight line. When the rotational speed of the rotor unit 1 is equal to or higher than the prescribed rotational speed, or when the vehicle conditions require the motor/generator be operated in the shorted state, the shorting rotor member 1B is driven to rotate relative to the drive rotor member 1A.

For example, when the motor/generator is switched from the normal state to the shorted state, the shorting rotor member 1B is driven in the direction indicated with the downward arrow in FIG. 6 relative to the drive rotor member 1A such that the relative positioning of the permanent magnets 8 of the drive rotor member 1A and the protruding poles 9 of the shorting rotor member 1B becomes offset in the circumferential direction as shown in FIG. 6.

In other words, when the motor/generator is switched from the normal state to the shorted state when, for example, the rotational speed of the rotor unit 1 is high, the shorting rotor member 1B is rotated relative to the drive rotor member 1A such that each protruding pole 9 straddles two circumferentially adjacent permanent magnets 8 that are as shown in FIG. 6. In the shorted state shown in FIG. 6, the protruding poles 9 straddle two circumferentially adjacent permanent magnets 8 (which have opposite polarities). Therefore, protruding poles 9 establish a short-circuit in the magnetic flux of the adjacent permanent magnets 8 as indicated with the double-dot chain lines shown in FIG. 6. As a result, the magnetic flux of the first magnetic circuit Φ1 (FIG. 1(b)) that passes through the drive rotor member 1A becomes small and the induced voltage of the coils 6 can be reduced.

Instead of arranging for the protruding poles 9 to be moved in the rotational direction, it is also acceptable to configure the motor/generator such that the protruding poles 9 are moved in the axial direction of the rotor unit 1 in order to establish a short-circuit in the magnetic flux of the adjacent permanent magnet 8.

The amount of magnetic flux that is shorted between the adjacent permanent magnets 8 varies depending on whether the protruding poles 9 are straddling two circumferentially adjacent permanent magnets 8 widely (i.e., overlapping two circumferentially adjacent permanent magnets 8 to a large degree) or narrowly (i.e., aligned almost entirely with only one permanent magnet 8 of the adjacent pair and overlapping the other permanent magnet 8 only slightly).

Consequently, although not shown in the figures, the amount of shorted magnetic flux is small when the protruding poles 9 are offset only slightly in the circumferential direction from the aligned state shown in FIG. 5 (i.e., state in which the protruding poles 9 are aligned with the permanent magnets 8) to a state in which the protruding poles 9 straddle two circumferentially adjacent permanent magnets 8 narrowly.

On the other hand, although not shown in the figures, the amount of shorted magnetic flux is largest when the protruding poles 9 are shifted even further from the state shown in FIG. 6 (i.e., state in which the protruding poles 9 are partially overlapping two circumferentially adjacent permanent magnets 8) to a state in which half of each protruding pole 9 overlaps one permanent magnet 8 and the remaining half of each protruding pole 9 overlaps the other permanent magnet 8 of each pair of each of the first and second drive rotor sections $1A_1$ and $1A_2$ (i.e., the widest possible straddling state).

By adjusting the amount by which the shorting rotor member 1B is shifted relative to the drive rotor member 1A, the amount by which the protruding poles 9 straddle two circumferentially adjacent permanent magnets 8 can be varied. Accordingly, the amount of shorted magnetic flux can be changed.

Additionally, in the first embodiment, the composite electrical current is preferably also controlled to establish a short-circuit in the magnetic flux of the permanent magnets 8 when a problem is detected in the battery that supplies electric power to the motor/generator or when a problem is detected in the electric circuit connecting the motor/generator to the battery. As a result, with the first embodiment, when there is a problem with the battery or the electric circuit, the induced voltage of the motor/generator can be reduced regardless of the rotational speed of the rotor unit 1 to help preserve the battery or the electric circuit.

Furthermore, since the amount of shorted magnetic flux can be varied independently of the rotational speed of the rotor unit 1 or the existence of a problem in the electric circuit in the first embodiment of the present invention, the operating range of the motor/generator can be expanded comparing to comparative examples of a motor/generator.

Figure 11:
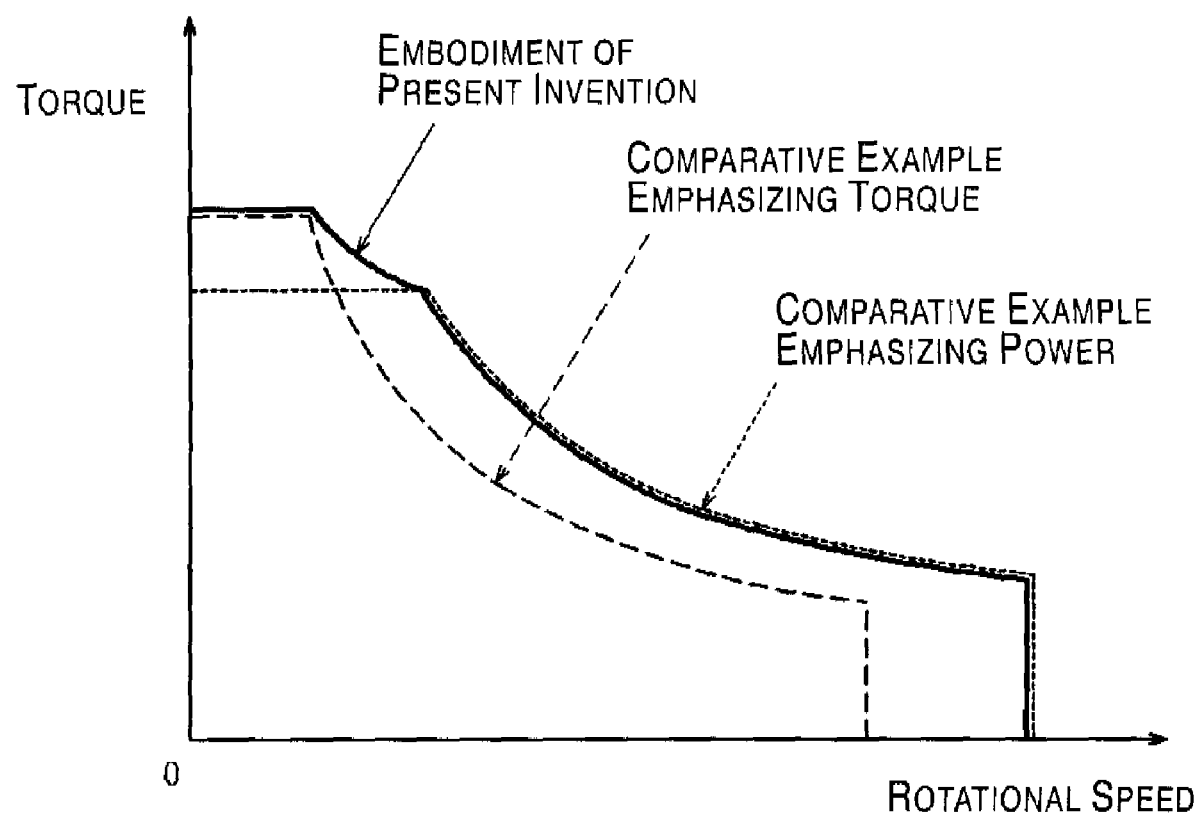
FIG. 11 is a characteristic diagram illustrating the operating regions of the motor/generator with respect to the rotor torque and the rotor rotational speed in cases of the embodiment of the present invention and the comparative examples.

FIG. 11 is a characteristic diagram illustrating the operating regions (torque region and rotational speed region) of the motor/generator in accordance with the first embodiment and two comparative examples of a motor/generator. In FIG. 11, the horizontal axis indicates the rotor rotational speed and the vertical axis indicates the rotor torque. The broken line having longer broken sections is a characteristic curve for a first comparative example of the motor/generator in which priority is given to torque output. In other words, the motor/generator of the first comparative example is designed such that the rotational speed region is narrow to avoid high induced voltages and the torque region is large. On the other hand, the broken line having shorter broken sections is a characteristic curve for a second comparative example in which priority is given to power output. The second comparative example of the motor/generator is designed such that the rotational speed region is wide to allow high induced voltages. The constant output curve of the second comparative example is larger than for the first comparative example emphasizing torque output but the torque region is narrower as shown in FIG. 11. The first and second comparative examples represent typical conventional motor/generators. Both of the first and second comparative examples of the motor/generator involve a tradeoff relationship with respect to the rotational speed region and the torque region, i.e., expanding the rotational speed region causes the torque region to become narrower and expanding the torque region causes the rotational speed region to become narrower.

On the other hand, with the motor/generator in accordance with the first embodiment, since the amount of shorted magnetic flux can be varied independently of the rotational speed of the rotor unit 1, both the rotational speed region and the torque region can be expanded as indicated with the solid-line curve shown in FIG. 11. As a result, the operating region enclosed by the horizontal axis, vertical axis, and constant output curve shown in FIG. 11 can be enlarged. Accordingly, the operating performance of the motor/generator can be greatly improved in accordance with the first embodiment of the present invention.

Moreover, in the present invention, when the rotational speed of the rotor unit 1 falls below the prescribed rotational speed while the induced voltage is being reduced in the shorted state, the shorting rotor member 1B is driven such that the shorting rotor member 1B rotates relative to the drive rotor member 1A. More specifically, the shorting rotor member 1B is rotated relative to the drive rotor member 1A so that the circumferential positions of the protruding poles 9 of the shorting rotor member 1B are aligned with the circumferential positions of the permanent magnets 8 as shown in FIG. 5. As a result, the magnetic flux of the first magnetic circuit Φ1 becomes large and the motor/generator can be operated in the normal state.

Figure 7A:
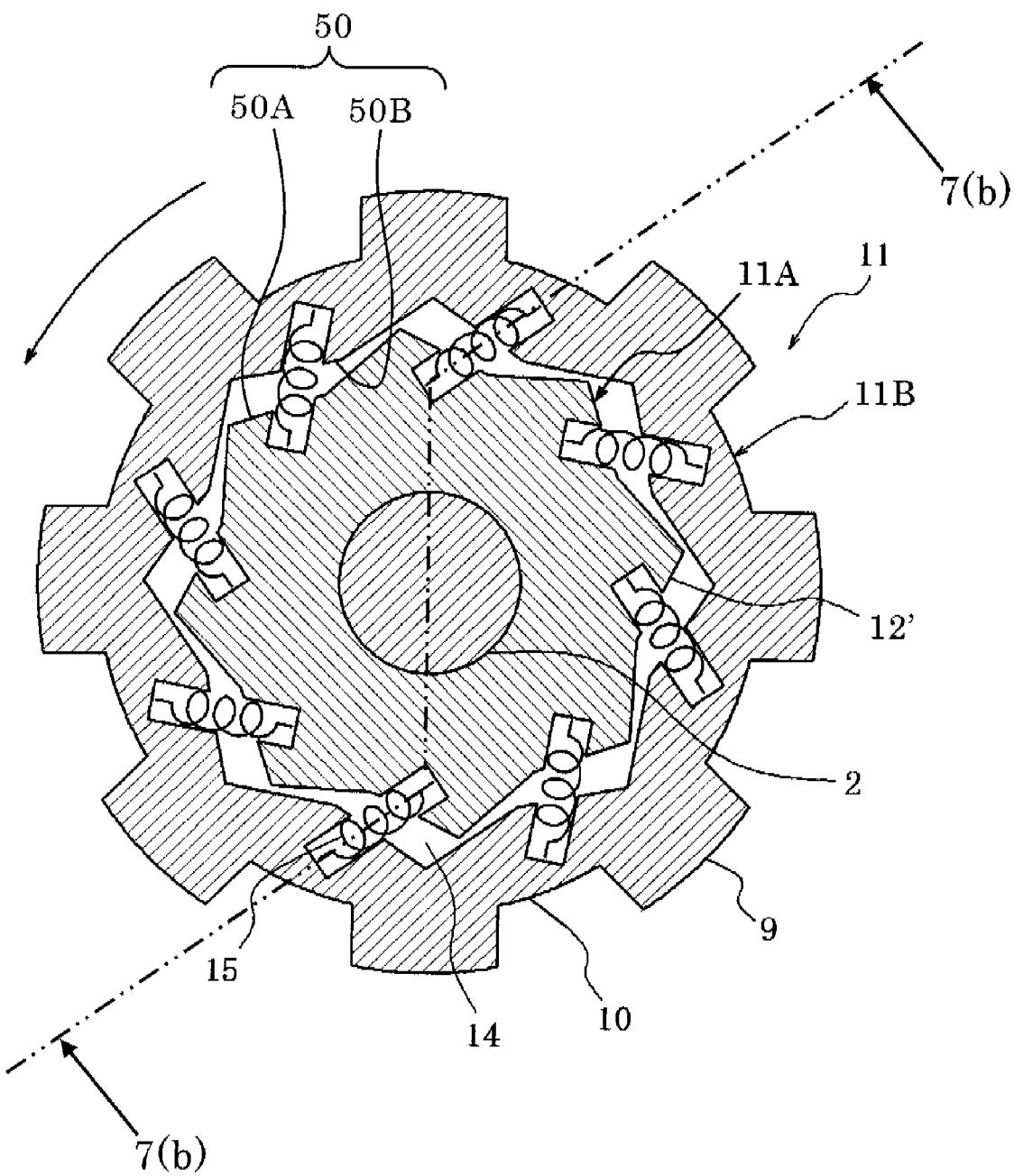
FIG. 7(a) is a simplified vertical cross sectional view of a modified structure of the rotor unit of the motor/generator as taken along a plane that is substantially perpendicular to the axis of the rotary shaft in accordance with the first embodiment of the present invention.
Figure 7B:
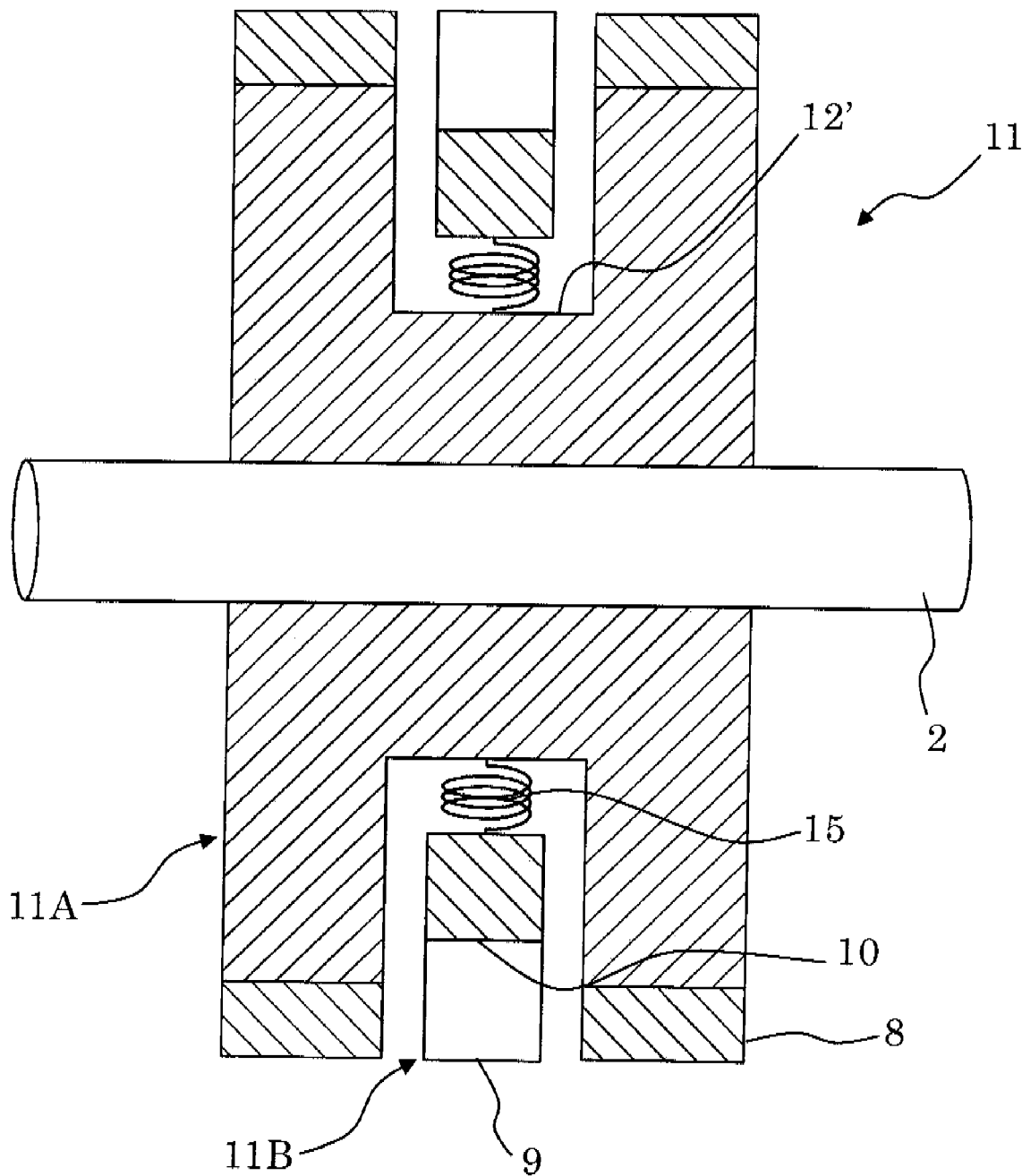
FIG. 7(b) is a simplified vertical cross sectional view of the rotor unit illustrated in FIG. 7(a) as taken along a section line 7(b)-7(b) of FIG. 7(a) in accordance with the first embodiment of the present invention.

FIGS. 7(a) and 7(b) illustrate a modified rotor unit 11 that can be used in the motor/generator in accordance with the first embodiment instead of the rotor unit 1 illustrated in FIGS. 1(a) to 1(c), 3 and 4. FIG. 7(a) is a lateral cross sectional view of the modified rotor unit 11 taken along a plane that is substantially perpendicular to the rotary shaft 2. FIG. 7(b) is a cross sectional view taken along a section line 7(b)-7(b) of FIG. 7(a).

In this modified rotor unit 11 shown in FIGS. 7(a) and 7(b), a stopper 50 is provided that is configured to limit a phase difference (relative displacement) between a drive rotor member 11A and a shorting rotor member 11B within a prescribed amount when the drive rotor member 11A and the shorting rotor member 11B are rotated relative to each other to produce the phase difference. In other words, the stopper

50 is configured and arranged to prevent the phase difference from exceeding the prescribed amount. Additionally, several elastic members 15 are installed between the shorting rotor member 11B and the drive rotor member 11A such that the relative rotation is possible between the drive rotor member 11A and the shorting rotor member 11B.

In view of the similarity between the rotor unit 1 illustrated in FIGS. 1(*a*) to 1(*c*), 3 and 4 and the modified rotor unit 11 illustrated in FIGS. 7(*a*) and 7(*b*), the parts of the modified rotor unit 11 that are identical to the parts of the rotor unit 1 will be given the same reference numerals as the parts of the rotor unit 1. Moreover, the descriptions of the parts of the modified rotor unit 11 that are identical to the parts of the rotor unit 1 may be omitted for the sake of brevity. The parts of the modified rotor unit 11 that are different from the parts of the rotor unit 1 are assigned new reference numerals and explanations thereof are provided below.

Similarly to the rotor unit 1 described previously, the modified rotor unit 11 shown in FIG. 7(*a*) has the drive rotor member 11A and the shorting rotor member 11B. The circumferential surface of the drive rotor member 11A (that faces the gap surface 4 shown in FIG. 1(*a*)) forms a recessed section 12' that extends around the entire circumference of an axial center portion of the drive rotor member 11A. The shorting rotor member 11B is housed inside the recessed section 12' of the drive rotor member 11A as shown in FIG. 7(*b*).

As shown in FIG. 7(*a*), the circumferential outline of the recessed section 12' as viewed in the axial direction preferably has the form of a generally star-shaped polygon. The recessed section 12' having this circumferential outline serves as a drive rotor stopper structure 50A formed on the drive rotor member 11A. Moreover, the internal circumference of the shorting rotor member 11B has a similar generally star-shaped polygonal outline. Thus, the internal circumference surface of the shorting rotor member 11B serves as a shorting rotor stopper structure 50B formed on the shorting rotor member 11B. The shorting rotor member 11B is arranged coaxially around the entire circumference of the recessed section 12'. A radial gap 14 is formed between the generally star-shaped polygonal outline of the recessed section 12' and the generally star-shaped polygonal outline of the inner surface of the shorting rotor member 11B as shown in FIG. 7(*a*).

The contours of the recessed sections 12' and the inner surface of the shorting rotor member 11B are arranged such that when the shorting rotor member 11B rotates the prescribed amount relative to the drive rotor member 11A, the internal circumference surface of the shorting rotor member 11B contacts the recessed section 12' such that the rotation of the shorting rotor member 11B with respect to the drive rotor member 11A is limited to within the prescribed amount. In other words, the drive rotor stopper structure 50A and the shorting rotor stopper structure SOB constitute the stopper 50 configured and arranged to prevent the phase difference (relative displacement) between the shorting rotor member 11B and the drive rotor member 11A from exceeding the prescribed amount.

Accordingly, by setting the position where the contact between the recessed section 12' and the inner surface of the shorting rotor member 11B occurs, the motor/generator can easily achieve the normal state shown in FIG. 5 in which the circumferential positions of the protruding poles 9 are aligned with the permanent magnets 8 and the shorted state (e.g., the state shown in FIG. 6) in which the protruding poles 9 overlap with (straddle) two circumferentially adjacent permanent magnets 8 having opposite polarities. The prescribed amount is set to a value equal to or smaller than the amount of relative rotation required for the protruding poles 9 to move from the normal state in which they are aligned with one permanent magnet 8 of each pair of circumferentially adjacent permanent magnets 8 to the shorted state in which the protruding poles 9 straddle two circumferentially adjacent permanent magnets 8 to the greatest possible degree such that the amount of shorted magnetic flux is maximized.

As shown in FIGS. 7(*a*) and 7(*b*), the elastic members 15 are arranged between the internal circumference of the shorting rotor member 11B and the external circumference of the recessed section 12' of the drive rotor member 11A. As shown in FIG. 7(*a*), the elastic members 15 are spaced apart at equal intervals in the circumferential direction. It is preferable for the elastic members 15 to be arranged such that the direction of elongation and contraction of each elastic member 15 substantially corresponds to the circumferential direction of the modified rotor unit 11.

Moreover, the elastic members 15 are further preferably configured and arranged to spring load the shorting rotor member 11B in the circumferential direction. More specifically, the elastic members 15 are preferably configured and arranged such that the spring forces (biasing forces) of the elastic members 15 act to move the protruding poles 9 of the shorting rotor member 11B toward the normal state shown in FIG. 5, in which the protruding poles 9 are aligned with one permanent magnet 8 of each pair of circumferentially adjacent permanent magnets 8. When the rotational speed of the modified rotor unit 11 is high, the shorting rotor member 11B is driven such that the protruding poles 9 are shifted to a position in which they straddle two circumferentially adjacent permanent magnets 8 as shown in FIG. 6. Then, when the rotational speed of the modified rotor unit 11 falls below the prescribed speed, the shorting rotor member 11B can be rotated automatically to the normal state in which the protruding poles 9 are aligned with the permanent magnets 8. More specifically, when the rotational speed of the modified rotor unit 11 returns to a low rotational speed (below the prescribed speed) or otherwise the conditions of the motor/generator is such that the motor/generator is to be returned to the normal state, the driving force exerted against the shorting rotor member 11B is terminated and the spring forces of the elastic members 15 act to return the shorting rotor member 11B to the position where the internal circumference of the shorting rotor member 1B contacts the polygonal shaped surface of the recessed section 12'. Accordingly, the shorting rotor member 11B can be returned from the shorted state to the normal state automatically by the spring forces of the elastic members 15 by simply terminating the driving force exerted against the shorting rotor member 11B. As a result, an additional control of the shorting rotor member 11B to drive the shorting rotor member 11B back to the normal state is not required, and thus, the switching from the shorted state to the normal state can be simplified.

Moreover, it is also acceptable to arrange the elastic members 15 such that the spring forces of the elastic members 15 act to move the protruding poles 9 toward the shorted state (e.g., the state shown in FIG. 6), in which the protruding poles 9 straddle two circumferentially adjacent permanent magnets 8 (which are arranged with opposite polarities). In such case, the motor/generator can be switched from the normal state to the shorted state by simply terminating the drive force exerted against the shorting rotor member 11B, and the shorting rotor member 11B is driven to rotate with respect to the drive rotor member 11A when the motor/generator is switched from the shorted state to the normal state. In other words, by arranging the elastic members 15 such that the spring forces thereof act to move the protruding poles 9 toward the shorted state (e.g., the state shown in FIG. 6), the shorting rotor member B can be rotated automatically such that the protruding poles 9 shift to the shorted state in which the protruding poles 9 are overlapping two circumferentially adjacent permanent magnets 8. When the rotational speed of the modified rotor unit 11 is low, the shorting rotor member 11B is driven such that the protruding poles 9 are moved to a position in which each of the protruding poles 9 is aligned with one permanent magnet 8 of each pair of the circumferentially adjacent permanent magnets 8 as shown in FIG. 5. When the rotational speed of the rotor unit 1 becomes high, the driving force exerted against the shorting rotor member 11B is terminated and the spring forces of the elastic members 15 act to rotate the shorting rotor member 11B to the position where the internal circumference of the shorting rotor member 11B contacts the polygonal shaped surface of the recessed section 12'. Accordingly, the shorting rotor member 11B can be shifted from the normal state to the shorted state automatically by the spring forces of the elastic members 15 by simply terminating the driving force exerted against the shorting rotor member 11B.

Accordingly, with the motor/generator in accordance with the first embodiment of the present invention, the composite electrical current is supplied to the coils 6 of the stator 3 to selectively drive the drive rotor member 1A and the shorting rotor member 1B to rotate as an integral unit or to rotate with respect to each other. Therefore, the motor/generator in accordance with the present invention can establish a short-circuit in the magnetic flux of the permanent magnets 8 by using a conventional structure of the stator 3 without the need for a separate actuator. As a result, increase in the size of the motor/generator can be suppressed.

Second Embodiment

Figure 8:
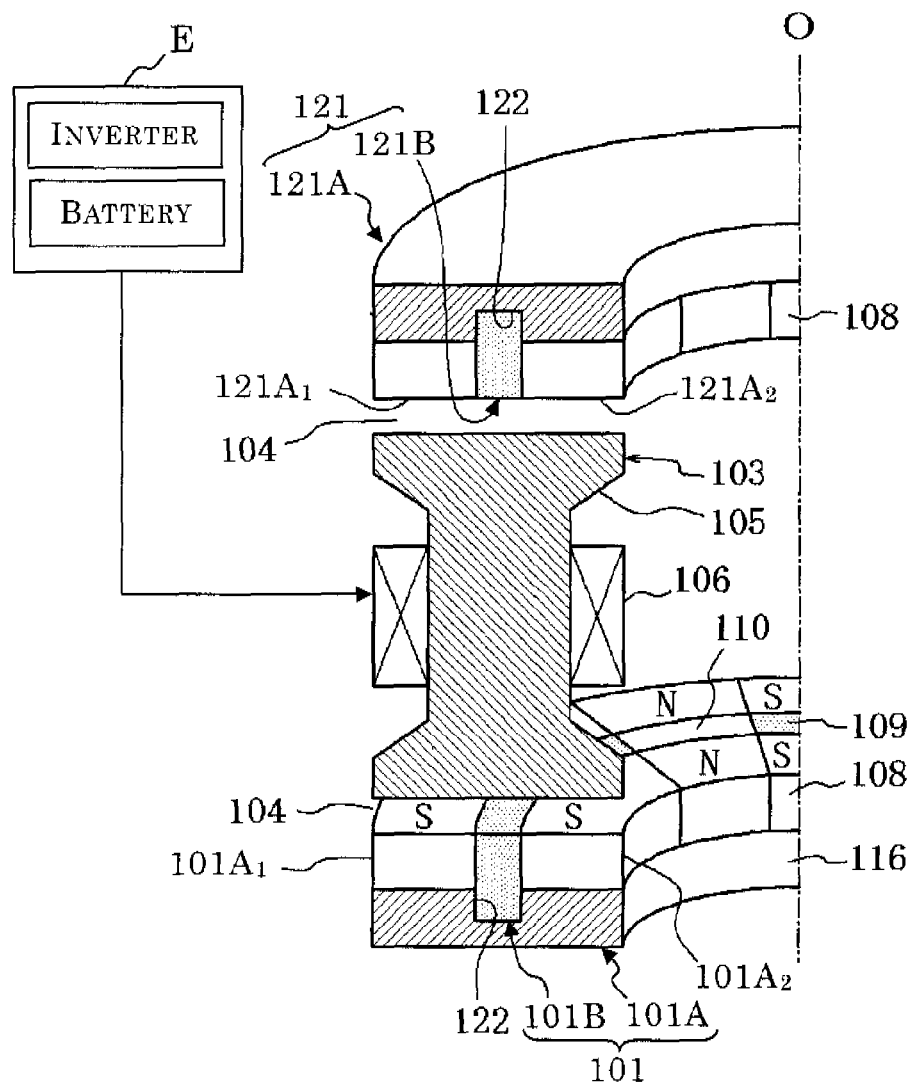
FIG. 8 is a simplified perspective view including a partial cross section of the motor/generator in accordance with a second embodiment of the present invention.
Figure 9:
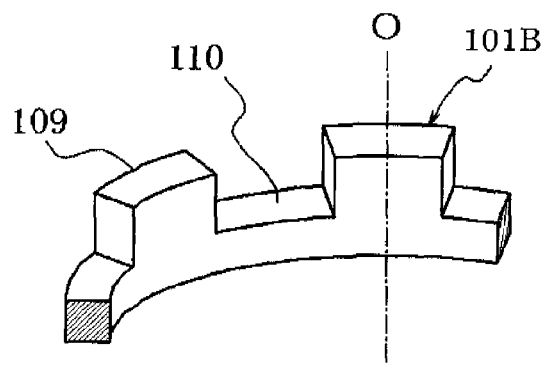
FIG. 9 is a simplified partial perspective view of a shorting rotor member of the motor/generator in accordance with the second embodiment of the present invention.
Figure 10:
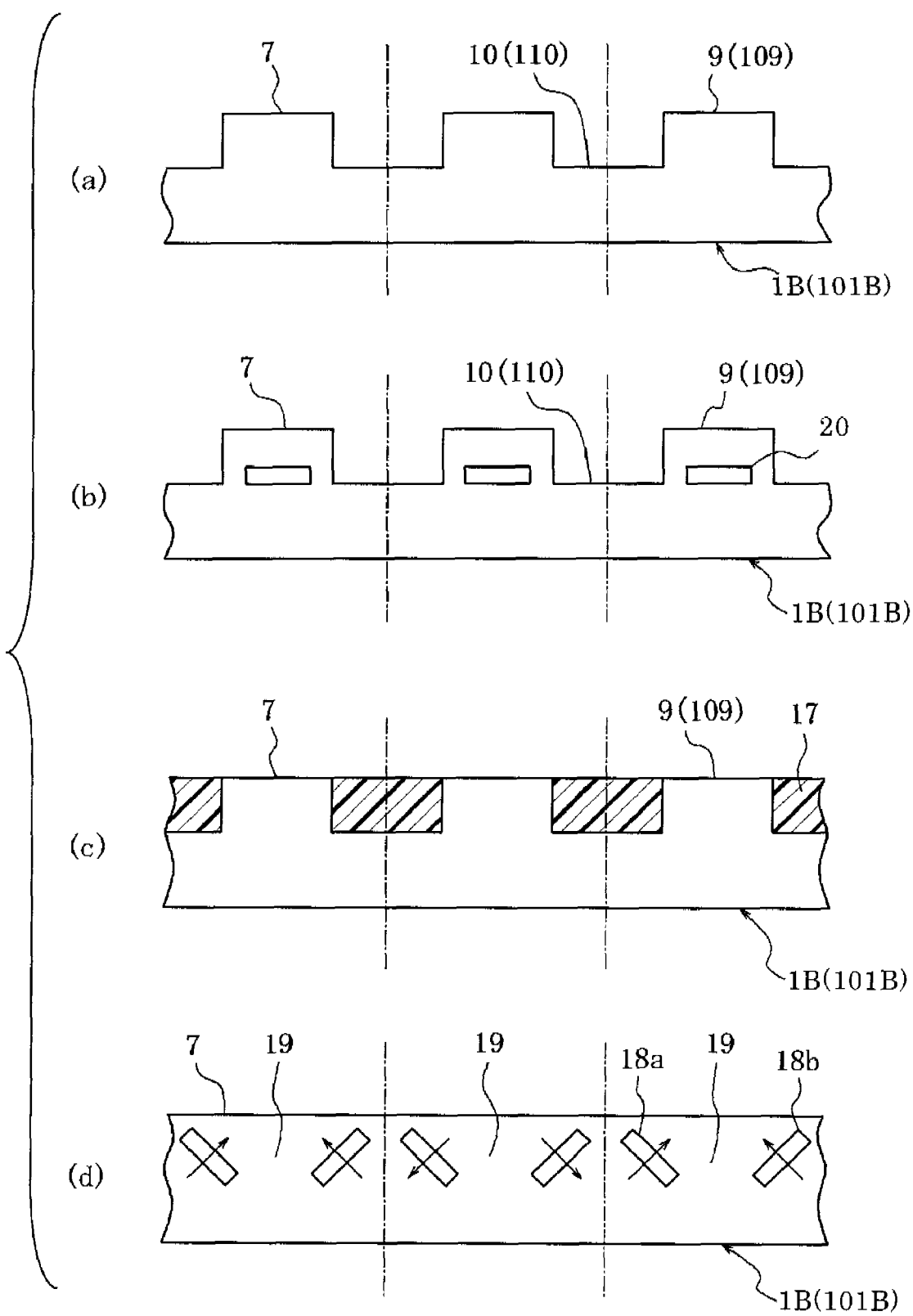
FIG. 10 is a series of diagrams (a) to (b) illustrating diagrammatic views of different structures of the shorting rotor member in accordance with the present invention with the circumferential direction of the shorting rotor member being extended into a generally straight line, wherein the diagram (a) illustrates the shorting rotor of the first and second embodiments shown in FIGS. 1 and 8, respectively, the diagram (b) illustrates a first alternative structure of the shorting rotor member in which the shorting rotor of the diagram (a) is further provided with a plurality of permanent magnets arranged inside a plurality of protruding pole sections, the diagram (c) illustrates a second alternative structure of the shorting rotor member in which the shorting rotor of the diagram (a) is further provided with a non-magnetic material filling spaces between the protruding pole sections, and the diagram (d) illustrates a third alternative structure of the shorting rotor member in which the spaces between the protruding pole sections of the shorting rotor member of the diagram (a) are replaced with a plurality of permanent magnets.

Referring now to FIGS. 8 to 10, a motor/generator in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 8 is a simplified perspective view including a partial cross section showing the structure of the motor/generator in accordance with the second embodiment of the present invention. As shown in FIG. 8, the motor/generator of the second embodiment includes a stator 103 and a pair of rotor units 101 and 121. In the second embodiment, the motor/generator is arranged as an axial gap structure in which the stator 103 and the rotor units 101 and 121 are arranged axially apart from each other with respect to a rotor rotational axis O (indicated with a single-dot chain line in FIG. 8) so as to have axial gaps 104 (axial air gaps) between the stator 103 and the rotor units 101 and 121.

The stator 103 is preferably mounted to a motor/generator casing member (not shown). The stator 103 is provided with a plurality of tooth sections 105. The tooth sections 105 are arranged circumferentially about the rotor rotational axis O and extend in a direction substantially parallel to the rotor rotational axis O. FIG. 8 shows only one of the tooth sections 105 in a cross sectional view and the other tooth sections 105 are omitted for the sake of brevity. Each of the tooth sections 105 includes axial ends that face the rotor unit 101 and the rotor unit 121, respectively. A coil 106 is wound around an axial center portion of each of the tooth sections 105 so that the coils 106 form electromagnets. As in the first embodiment, the coils 106 are configured and arranged to be energized with the composite electric current including the first current component and the second current component.

The rotor unit 101 is arranged on one side of the stator 103 to be spaced apart from the stator 103 along the direction of the rotor rotational axis O. Similarly, the rotor unit 121 is arranged on the other side of the stator 103 to be spaced apart from the stator 103 along the direction of the rotor rotational axis O. The rotor units 101 and 121 are preferably coupled together as an integral unit by a common rotor shaft (not shown). Since the rotor units 101 and 121 are structurally symmetrical to each other along the vertical direction as viewed in FIG. 8, the structure of the rotor units 101 and 121 will now be explained based solely on an example of the rotor unit 101.

As shown in FIG. 8, the rotor unit 101 is an annular member centered on the rotor rotational axis O. FIG. 8 shows a portion corresponding to approximately one fourth of the entire rotor unit 101. The rotor unit 101 includes a drive rotor member 101A (rotor member) and a shorting rotor member 101B (shorting member). The drive rotor member 101A and the shorting rotor member 101B are also annular members centered on the rotor rotational axis O. The drive rotor member 101A has a plurality of permanent magnets 108. The shorting rotor member 101B is configured and arranged to selectively establish a short-circuit in the magnetic flux of the permanent magnets 108. The drive rotor member 101A further includes a first drive rotor section $101A_1$ (first rotor section) and a second drive rotor section $101A_2$ (second rotor section). The drive rotor member 101A and the shorting rotor member 101B rotate together as an integral unit in the normal state in which the magnetic flux of the permanent magnets 108 are not shorted. Then, the shorting rotor member 101B rotates relative to the drive rotor member 101A when a prescribed condition exists as described in more detail below.

As shown in FIG. 8, a coaxial annular groove 122 is provided in the drive rotor member 101A between the first drive rotor section $101A_1$ and the second drive rotor section $101A_2$. The annular shorting rotor member 101B is installed in the annular groove 122 such that the shorting rotor member 101B can selectively rotate relative to the drive rotor member 101A. In other words, the first drive rotor section $101A_1$ and the second drive rotor section $101A_2$ are arranged on both radial sides of the shorting rotor member 101B so that axial end surfaces of the first and second drive rotor sections $101A_1$ and $101A_2$ and an axial end surface of the shorting rotor member 101B face toward the axial gap 104 between the rotor unit 101 and the stator 103.

As shown in FIG. 8, the permanent magnets 108 are arranged circumferentially on a gap surface (axial surface) of the drive rotor member 101A, i.e., the surface of the drive rotor member 101A that faces toward the axial gap 104. The permanent magnets 108 are arranged such that any two circumferentially adjacent permanent magnets 108 have the opposite pole facing toward the axial gap 104. In other words, the N pole of one permanent magnet 108 of each pair of circumferentially adjacent permanent magnets 108 faces toward the gap 104 and the S pole of the other permanent magnet 8 of each pair faces toward the gap 104. The permanent magnets 108 provided on the first drive rotor section $101A_1$ all have the same circumferential length. Likewise, the permanent magnets 108 provided on the second drive rotor section $101A_2$ all have the same circumferential length.

The permanent magnets 108 provided on the second drive rotor section $101A_2$ on the radially inward side of the shorting rotor member 101B and the permanent magnets 108 provided on the first drive rotor section $101A_1$ on the radially outward side of the shorting rotor member 101B are arranged coaxially with respect to one another and aligned with each other circumferentially such that N poles are paired with N poles and S poles are paired with S poles. The angle about the rotor rotational axis O occupied by each permanent magnet 108 is the same. Thus, the circumferentially facing ends of the outer permanent magnets 108 provided on the first drive rotor section 101A$_1$ and the corresponding circumferentially facing ends of the inner permanent magnets 108 provided on the second drive rotor section 101A$_2$ can be joined with straight lines that intersect the rotor rotational axis O when extended radially inward.

FIG. 9 is a simplified partial perspective view of the shorting rotor member 101B illustrating a cut-away portion (approximately one third) of the shorting rotor member 101B. As shown in FIG. 9, the shorting rotor member 101B includes a plurality of protruding poles 109 (magnetic pole sections) and a plurality of recess portions 110 that are formed between the adjacent protruding poles 109.

As shown in FIG. 8, the shorting rotor member 101B is inserted in the annular groove 122 of the drive rotor member 101A such that the protruding poles 109 of the shorting rotor member 101B are provided between the inner permanent magnets 108 whose S poles face toward the gap surface and the outer permanent magnets 108 whose S poles face toward the gap surface, for example. In the normal state in which the magnetic flux of the permanent magnets 108 are not shorted, the circumferential positions of the protruding poles 109 are aligned with the circumferential positions of the permanent magnets 108 on both radial sides thereof. The recess portion 110 is provided between each pair of circumferentially adjacent protruding poles 109, as shown in FIGS. 8 and 9. In the normal state, as shown in FIG. 8, the circumferential positions of the of the recess portions 110 are aligned with the circumferential positions of the permanent magnets 108 on both radial sides whose N poles face toward the gap surface, for example. Although not shown in the figures, it is also acceptable to arrange the protruding poles 109 between the pairs of outer and inner permanent magnets 108 whose N poles face toward the gap surface in the normal state, i.e., the opposite of the arrangement shown in FIG. 8.

Accordingly, as shown in FIGS. 8 and 9, the shorting rotor member 101B has the protruding poles 109 and the recess portions 110 of equal circumferential lengths arranged alternately in the circumferential direction. As mentioned above, the protruding poles 109 and the recess portions 110 are arranged alternately so that circumferential positions of the protruding poles 109 are aligned with the circumferential positions of the permanent magnets 108. The permanent magnets 108 are mounted on both the first drive rotor section 101A$_1$ disposed radially outwardly of the shorting rotor member 101B and the second drive rotor section 101A$_2$ disposed radially inwardly of the shorting rotor member 101B. Therefore, each of the first and second drive rotor sections 101A$_1$ and 101A$_2$ of the drive rotor member 101A includes twice as many permanent magnets 108 along the circumferential direction as the protruding poles 109 of the shorting rotor member 101B. Similarly to the first embodiment, by providing the permanent magnets 108 twice as many as the protruding poles 109, the drive rotor member 101A and the shorting rotor member 101B can be selectively driven separately using the composite electrical current.

Accordingly, with the rotor unit 101, it is possible to selectively drive the drive rotor member 101A alone, to drive the drive rotor member 101A and the shorting rotor member 101B simultaneously, or to drive the shorting rotor member 101B alone.

In the normal state, as explained previously with reference to FIG. 5, the drive rotor member 101A is driven such that the protruding poles 109 are aligned with one permanent magnet 108 of each of the first and second drive rotor sections 101A$_1$ and 101A$_2$. When the rotational speed of the rotor unit 101 is equal to or higher than a prescribed rotational speed or when other prescribed conditions exist, the shorting rotor member 101B is driven to shift in the direction indicated with the arrow in FIG. 6 with respect to the drive rotor member 101A. Therefore, the protruding poles 109 straddle (partially overlap) two circumferentially adjacent permanent magnets 108.

In the normal state shown in FIG. 5, the protruding poles 109 do not straddle two circumferentially adjacent permanent magnets 108 (which have opposite polarities). Therefore, the protruding poles 109 do not establish a short-circuit in the magnetic flux of the adjacent permanent magnets 108. Consequently, the magnetic flux of the first magnetic circuit (e.g., the first magnetic circuit Φ1 in FIG. 1(b)) formed between the rotor units 101 and 121 and the stator 103 is large and the efficiency of the motor/generator can be increased.

On the other hand, in the shorted state (e.g., the state shown in FIG. 6), the protruding poles 109 are positioned to straddle two circumferentially adjacent permanent magnets 108 (which have opposite polarities). Therefore, the protruding poles 109 establish a short-circuit in the magnetic flux of the adjacent permanent magnets 108 as indicated with the double-dot chain line in FIG. 6.

Consequently, the magnetic flux of the first magnetic circuit formed between the rotor units 101 and 121 and the stator 103 is reduced to a small amount of flux and the induced voltage of the coils 106 can be reduced.

As explained previously, the motor/generator of the present invention includes the shorting rotor member 1B or 101B having the protruding poles 9 or 109 on both in the case of the radial gap type motor/generator (FIG. 1) and the case of the axial gap type motor/generator (FIG. 8). The motor/generator of the present invention is configured to use the composite electrical current to selectively drive the shorting rotor member 1B or 101B and to establish a short-circuit in the magnetic flux of the permanent magnets 8 or 108 provided on the drive rotor member 1A or 101A when a prescribed condition exists.

Alternatively, diagrams (b) to (d) of FIG. 10 show a plurality of modified structures of the shorting rotor member 1B or 101B with the circumferential direction extended into a generally straight line, while a diagram (a) of FIG. 10 illustrates the shorting rotor member 1B or 101B of the embodiment shown in FIG. 1 or FIG. 8. Instead of using the shorting rotor member 1B or 101B including the combination of the protruding poles 9 or 109 and the spaces 10 or 10 as described in the first or second embodiment, the shorting rotor member 1B or 101B can be made with any one of the configurations described below.

The diagram (b) of FIG. 10 shows the shorting rotor member 1B (101B) provided with a plurality of permanent magnets 20 arranged inside the protruding poles 9 (109). In the structure shown in the diagram (b) of FIG. 10, the permanent magnets 20 are arranged such that the magnetization direction of the permanent magnets 20 is the same as the protruding direction of the protruding poles 9 (109), i.e., perpendicular to the radial gap surface or the axial gap surface. Even when the permanent magnets 20 are provided in the shorting rotor member 1B (101B) as shown in the diagram (b) of FIG. 10, the shorting rotor member 1B (101B) can be selectively driven independently from the drive rotor member 1A (101A) using the composite electrical current.

The diagram (c) of FIG. 10 shows the shorting rotor member 1B (101B) in which the recess portions 10 (110) between the protruding poles 9 (109) are filled with a non-magnetic material such as a resin 17 or other non-magnetic material with a large magnetic resistance. Since the resin 17 is disposed between the protruding poles 9 (109) as shown in the diagram (c) of FIG. 10, the shorting rotor member 1B (101B) can establish a short-circuit in the magnetic flux of the permanent magnets 8 (108) in the same manner as in the first and second embodiments shown in the diagram (a) of FIG. 10.

The diagram (d) of FIG. 10 shows the shorting rotor member 101B in which the protruding poles 9 (109) and the recess portions 10 (110) illustrated in the diagram (a) are replaced with a structure using a plurality of permanent magnets 18a and 18b. In such case, the permanent magnets 18a and 18b are embedded inside the shorting rotor member 1B (101B) instead of having the protruding poles 9 (109) and the recess portions 10 (110) arranged alternately. The shorting rotor member 101B includes a plurality of front yoke sections 19 made of a magnetic material. The front yoke sections 19 are provided in circumferential positions corresponding to the protruding poles 9 (109) of the structures shown in the diagrams (a) to (c) of FIG. 10. Both sides of each of the front yoke sections 19, as shown in the diagram (d) of FIG. 10, includes a plurality of pairs of left and right permanent magnets 18a and 18b. In other words, each of the front yoke sections 19 is made of a magnetic material and is bordered by the permanent magnets 18a and 18b and the radial gap surface (or axial gap surface). As indicated by the arrows in the diagram (d) of FIG. 10, both of the permanent magnets 18a and 18b of each pair are magnetized to the same polarity.

When the shorting rotor member 1B (101B) illustrated in the diagram (d) of FIG. 10 is used, in the normal state, as shown in FIG. 5, the front yoke sections 19 are aligned in the circumferential direction with one permanent magnet 8 (108) of each of the first and second drive rotor sections $1A_1$ and $1A_2$ ($101A_1$ and $101A_2$). Therefore, the front yoke sections 19 do not establish a short-circuit in the magnetic flux of the adjacent permanent magnets 8 (108). When the rotational speed of the rotor unit 1 (101 and 121) is high or when other prescribed conditions exist, the shorting rotor member 101B of the diagram (d) of FIG. 10 is driven to rotate with respect to the drive rotor member 1A (101A). Therefore, the front yoke sections 19 straddle (partially overlap) two circumferentially adjacent permanent magnets 8 (108) (which have opposite polarities). As a result, similarly to the state illustrated in FIG. 6, the magnetic flux of adjacent permanent magnets 8 (108) can be shorted.

In each of the embodiments of the motor/generator just described above, the composite electrical current is supplied to the coils 6 (106) of the stator 3 (103), and the first magnetic circuit $\Phi 1$ (FIG. 1(b)) is formed using the first current component of the composite electrical circuit and the second magnetic circuit $\Phi 2$ (FIG. 1(c)) is formed using the second current component of the composite electrical current. The first magnetic circuit $\Phi 1$ is used to drive the drive rotor member 1A (101A) and the second magnetic circuit $\Phi 2$ is used to drive the shorting rotor member 1B (101B) to switch between the shorted state and the normal state. As a result, the permanent magnets 8 (108) can be shorted using the conventional electromagnets (formed by the coils 6 (106) of the stator 3 (103)) without the need for a separate actuator or other operating mechanism. Consequently, the size of the motor/generator can be suppressed.

Furthermore, with the embodiments described above, it is possible to operate the shorting rotor member 1B (101B) independently of the rotational speed of the rotor unit 1 (101 and 121) by controlling the second current component of the composite electrical current. As a result, the magnetic flux of the permanent magnets 8 (108) can be shorted during any operating state regardless of the rotational speed of the rotor unit 1 (101 and 121). Accordingly, the induced voltage can be suppressed any time it is necessary to do so, such as when there is a problem with the battery or when the temperature of a device provided in the electric circuit is abnormally high.

In addition to operating the shorting rotor member 1B (101B) independently of the rotational speed of the rotor unit 1 (101 and 121), the shorting rotor member B can be operated to vary the amount of shorted magnetic flux. As a result, as shown in FIG. 11, the operating region can be expanded comparing to the comparative examples of the motor/generator.

Additionally, the drive rotor member 1A (101A) has the first drive rotor section $1A_1$ ($101A_1$) and the second drive rotor section $1A_2$ ($101A_2$). The first and second drive rotor sections $1A_1$ and $1A_2$ ($101A_1$ and $101A_2$) are provided on both sides of the shorting rotor member B, respectively, and each of the first and second drive rotor sections $1A_1$ and $1A_2$ ($101A_1$ and $101A_2$) has a surface that faces the radial gap 4 or the axial gap 104 that lies between the drive rotor member 1A (101A) and the stator 3 (103). As a result, the attractive and repelling forces exerted against the drive rotor member A by the stator 3 (103) can be prevented from causing unnecessary forces to act on the rotary shaft 2 of the rotor unit 1 (101 and 121).

More specifically, if a drive rotor member that has only a single drive rotor section is used in a motor/generator having the radial gap structure as shown in FIG. 1, the axial center of the drive rotor member would be offset from the axial center of the stator 3 (the tooth sections 5). Consequently, the attractive and repelling forces exerted against the drive rotor member by the stator 3 would cause an axial force to act on the drive rotor member. Therefore, an unnecessary force acts on the rotary shaft 2 of the rotor unit 1. On the other hand, with the present invention, the first and second drive rotor sections $1A_1$ and $1A_2$ are preferably arranged on both axial sides of the shorting rotor member 1B, respectively. Thus, the axial forces are counterbalanced and an unnecessary force does not act on the rotary shaft 2.

Similarly, if a drive rotor member that has only a single drive rotor section is used in a motor/generator having the axial gap structure as shown in FIG. 8, the radial center of the drive rotor member would be offset from the radial center of the stator 103 (the tooth sections 105). Consequently, the attractive and repelling forces exerted against the drive rotor member by the stator 103 would cause a radial force to act on the drive rotor member. Therefore, an unnecessary force acts on the rotary shaft 2 of the rotor unit 101. On the other hand, with the present invention, the first and second drive rotor sections $101A_1$ and $101A_2$ are preferably arranged on both radial sides of the shorting rotor member 101B, respectively. Thus, the radial forces are counterbalanced and an unnecessary force does not act on the rotary shaft 2.

Any of the configurations exemplified in the diagrams (a) to (d) of FIG. 10 can be used for the shorting rotor member 1B (101B), which serves as a permanent magnet shorting mechanism.

Moreover, the present invention is not limited to establishing a short-circuit in the magnetic flux of the permanent magnets 8 (108) when the rotational speed of the rotor unit 1 (101 and 121) is high (e.g., the rotational speed is greater than the prescribed value). For example, the magnetic flux of the permanent magnets 8 (108) can be shorted when there is a problem with a battery (not shown) used to supply electric power to the coils 6 (106) of the electromagnets or when there is a problem with an electric circuit that connects the battery to the coils 6 (106) of the electromagnets. As a result, even when the rotational speed of the rotor unit 1 (101 and 121) is low, the battery can be protected and such electric circuit components as an inverter or a semiconductor device inside the inverter can be protected by establishing a short-circuit in the magnetic flux of the permanent magnets 8 (108).

In the embodiments described above, The permanent magnets 8 (108) arranged circumferentially to be centered around the rotary shaft 2 are provided on the rotor unit 1 (101 and 121). The shorting rotor member 1B (101B) mounted to the rotor unit 1 (101 and 121) is arranged as the annular member that is made of a magnetic material and provided with a plurality of the protruding poles 9 (109). The shorting rotor member 1B (101B) can be rotated to a position where the protruding poles 9 (109) function to establish a short-circuit in the magnetic flux of the adjacent permanent magnets 8 (108). In other words, the shorting rotor member 1B (101B) can be selectively operated using torque generated by the motor/generator. As a result, the motor/generator in accordance with the embodiments of the present invention can suppress the induced voltage while remaining approximately the same size as a conventional motor/generator.

In the first embodiment as illustrated in FIG. 1, the motor/generator has a radial gap structure in which the rotor unit 1 and the stator 3 are arranged radially relative to each other to have the radial gap 4 between the rotor unit 1 and the stator 3. The permanent magnets 8 are arranged on the radial gap surface 7a of the rotor unit 1, i.e., the surface of the rotor unit 1 that faces the stator 3 across the radial gap 4. The permanent magnets 8 are arranged circumferentially such that the polarities of any two circumferentially adjacent permanent magnets 8 are opposite each other. The shorting rotor member 1B having the circumferentially arranged protruding poles 9 is mounted to the rotor unit 1 such that the protruding poles 9 are arranged at the radial gap surface 7b of the rotor unit 1. With this structure, the induced voltage can be suppressed when necessary in the motor/generator having the radial gap structure.

In the second embodiment shown in FIG. 8, the motor/generator has an axial gap structure in which the rotor units 101 and 121 and the stator 103 are arranged along the direction of the rotor rotational axis O to have the axial gaps 104 between the rotor units 101 and 121 and the stator 103. The permanent magnets 108 are arranged on an axial gap surface of the rotor unit 101 (121), i.e., the surface of the rotor unit 101 (121) that faces the stator 103 across the axial gap 104. The permanent magnets 108 are arranged circumferentially such that the polarities of any two circumferentially adjacent permanent magnets 108 are opposite each other. The shorting rotor member B having the circumferentially arranged protruding poles 109 is mounted to the rotor unit 101 such that the protruding poles 109 are arranged at the axial gap surface of the rotor unit 101. With this structure, the induced voltage can be suppressed when necessary in the motor/generator having the axial gap structure.

As illustrated in the diagrams (b) and (d) of FIG. 10, it is also acceptable to provide permanent magnets 20 or 18a and 18b inside the protruding poles 9 (109) of the shorting rotor member 1B (101B). In such case, the magnetic flux of adjacent permanent magnets 8 (108) can be shorted with the shorting rotor member 1B (101B) structured as shown in the diagrams (b) and (d) of FIG. 10.

As illustrated in FIGS. 7(a) and 7(b), the amount of relative rotation between the shorting rotor member 11B and the drive rotor member 11A can be limited to within the prescribed amount by making the internal circumference of the shorting rotor member 11B and the external circumference of the recessed section 12' of the drive rotor member 11A each have a polygonal shape and providing the gap 14 therebetween. With such structure of the modified rotor unit 11, the normal state shown in FIG. 5 in which the circumferential positions of the protruding poles 9 are aligned with the permanent magnets 8 (i.e., the protruding poles 9 overlap only one permanent magnet 8 of each pair of circumferentially adjacent permanent magnets 8) and the shorted state (e.g., the state shown in FIG. 6) in which the protruding poles 9 overlap (straddle) two circumferentially adjacent permanent magnets 8 having opposite polarities can be readily achieved.

Moreover, as illustrated in FIGS. 7(a) and 7(b), the shorting rotor member 11B is mounted to the drive rotor member 11A such that the shorting rotor member 11B can rotate relative to the drive rotor member 11A and the elastic members 15 are disposed between the shorting rotor member 11B and the drive rotor member 11A. Consequently, the shorting rotor member 1B cannot rotate limitlessly relative to the drive rotor member 11A. Thus, the drive force imparted to the shorting rotor member 11B when the shorting rotor member 11B is driven (rotated relative to the drive rotor member A) can be transferred through the elastic members 15 to the rotary shaft 2 and outputted, thereby enabling the drive force to be used without waste.

Additionally, the spring forces of the elastic members 15 can be set such that the relative position of the shorting rotor member 11B is aligned with the permanent magnets 8 as shown in FIG. 5 during the normal state and such that the shorting member 11B rotates against the spring forces of the elastic member 15 to the offset state (shorted state (e.g., the state shown in FIG. 6) when the rotational speed of the rotor unit 11 is high. Thus, when the rotational speed of the rotor unit 11 returns to a low rotational speed or otherwise returns to the conditions that requires the normal state, the shorting rotor member 11B can be returned automatically to the normal position shown in FIG. 5, i.e., the position where the protruding poles 9 are aligned with (not straddling) the permanent magnets 8, by simply terminating the driving force exerted against the shorting rotor member 11B because the spring forces of the elastic members 15 act to return the shorting rotor member B to said normal position. As a result, the shorting rotor member 11B does not need to be driven back to the normal state and the return process can be simplified.

The present invention is not limited to the embodiments described herein and various modifications can be made without departing from the scope of the invention. For example, the embodiments shown in FIGS. 1 and 8 can be modified from having the drive rotor member 1A (101A) with the first and second drive rotor sections $1A_1$ and $1A_2$ ($101A_1$ and $101A_2$) arranged on both sides of the shorting rotor member 1B (101B) to having one drive rotor member arranged on one side of the shorting rotor member 1B (101B).

Also, the stopper mechanism for limiting the amount of the relative rotation between the drive rotor member 11A and the shorting rotor member 11B is not limited to the stopper 50 as shown in FIGS. 7(a) and 7(b), which includes the recessed section 12' of the drive rotor member 11A having the polygonal external circumference and the shorting rotor member 11B having the polygonal internal circumference. Rather, any structure or mechanism for limiting the amount of relative rotation between the drive rotor member 1A (101A) and the shorting rotor member 1B (101B) can be used as the stopper of the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A motor/generator comprising:
a rotor member having a plurality of permanent magnets;
a shorting member configured and arranged to selectively establish a short-circuit in magnetic flux of the permanent magnets of the rotor member to switch between a normal state in which the magnetic flux of the permanent magnets is not shorted and a shorted state in which the magnetic flux of the permanent magnets is shorted; and
a stator having a plurality of coils configured and arranged to be energized with a composite electrical current including first and second current components, the stator being further configured and arranged to form a first magnetic circuit between the coils and the permanent magnets of the rotor member with the first current component of the composite electrical current to drive the rotor member and to form a second magnetic circuit between the coils and the shorting member with the second current component of the composite electrical current to selectively switch between the normal state and the shorted state,
the coils, the permanent magnets and the shorting member being arranged with respect to each other such that the first magnetic circuit produces a first torque that is exerted on the rotor member and the second magnetic circuit produces a second torque that is exerted on the shorting member with the first and second torques being selectively controlled independently in order to independently control movement of the shorting member with respect to the rotor member.

2. The motor/generator as recited in claim 1, wherein
the rotor member includes an annular first rotor section and an annular second rotor section with the first and second rotor sections of the rotor member being configured and arranged to rotate about a rotational axis as an integral unit, and
the shorting member is disposed between the first rotor section and the second rotor section of the rotor member.

3. The motor/generator as recited in claim 2, wherein
the stator faces the rotor member and the shorting member in a radial direction with respect to the rotational axis of the rotor member such that a radial gap exists between the stator and the rotor member and between the stator and the shorting member, and
the first and second rotor sections of the rotor member are disposed on both axial sides of the shorting member, respectively, such that circumferential surfaces of the first and second rotor sections and the shorting member face the radial gap.

4. The motor/generator as recited claim 2, wherein
the stator faces the rotor member and the shorting member in an axial direction with respect to the rotational axis of the rotor such that an axial gap exists between the stator and the rotor member and between the stator and the shorting member, and
the first and second rotor sections of the rotor member are disposed on both radial sides of the shorting member, respectively, such that axial end surfaces of the first and second rotor sections and the shorting member face the axial gap.

5. A motor/generator comprising:
a rotor member having a plurality of permanent magnets;
a shorting member configured and arranged to selectively establish a short-circuit in magnetic flux of the permanent magnets of the rotor member to switch between a normal state in which the magnetic flux of the permanent magnets is not shorted and a shorted state in which the magnetic flux of the permanent magnets is shorted; and
a stator having a plurality of coils configured and arranged to be energized with a composite electrical current including first and second current components, the stator being further configured and arranged to form a first magnetic circuit between the coils and the permanent magnets of the rotor member with the first current component of the composite electrical current to drive the rotor member and to form a second magnetic circuit between the coils and the shorting member with the second current component of the composite electrical current to selectively switch between the normal state and the shorted state,
the shorting member including an annular body having a plurality of magnetic pole sections configured and arranged to form a path for the second magnetic circuit, the shorting member being disposed adjacent to the rotor member such that the shorting member is rotatable relative to the rotor member, the shorting member being configured and arranged to achieve the normal state when the shorting member is positioned relative to the rotor member such that each of the magnetic pole sections do not straddle the permanent magnets disposed adjacent to each other, and to achieve the shorted state when the shorting member is positioned relative to the rotor member such that at least one of the magnetic pole sections straddle two adjacent permanent magnets.

6. The motor/generator as recited in claim 5, wherein a number of the magnetic pole sections that is equal to one half of a number of the permanent magnets of the rotor member.

7. The motor/generator as recited in claim 5, further comprising
a stopper configured and arranged to limit a relative displacement between the shorting member and the rotor member to within a prescribed amount.

8. The motor/generator as recited in claim 5, further comprising
an elastic member disposed between the shorting member and the rotor member.

9. The motor/generator as recited in claim 8, wherein the elastic member exerts a biasing force between the shorting member and the rotor member.

10. The motor/generator as recited in claim 5, wherein the rotor member includes an annular first rotor section and an annular second rotor section with the first and second rotor sections of the rotor member being configured and arranged to rotate about a rotational axis as an integral unit, and
the shorting member is disposed between the first rotor section and the second rotor section of the rotor member.

11. The motor/generator as recited in claim 10, wherein the stator faces the rotor member and the shorting member in a radial direction with respect to the rotational axis of the rotor member such that a radial gap exists between the stator and the rotor member and between the stator and the shorting member, and
the first and second rotor sections of the rotor member are disposed on both axial sides of the shorting member, respectively, such that circumferential surfaces of the first and second rotor sections and the shorting member face the radial gap.

12. The motor/generator as recited claim 10, wherein the stator faces the rotor member and the shorting member in an axial direction with respect to the rotational axis of the rotor member such that an axial gap exists between the stator and the rotor member and between the stator and the shorting member, and
the first and second rotor sections of the rotor member are disposed on both radial sides of the shorting member, respectively, such that axial end surfaces of the first and second rotor sections and the shorting member face the axial gap.

13. The motor/generator as recited in claim 5, wherein the magnetic pole sections of the shorting members are equally spaced apart in a circumferential direction of the shorting member.

14. A motor/generator comprising:

drive force outputting means for outputting a drive force;

shorting means for establishing a short-circuit in magnetic flux of the drive force outputting means; and switching means for selectively operating the drive force outputting means and the shorting means independently using a composite electrical current including first and second current components by forming a first magnetic circuit between the switching means and the drive force outputting means with the first current component of the composite electrical current to drive the drive force outputting means and by forming a second magnetic circuit between the switching means and the shorting means with the second current component of the composite electrical current to selectively switch between the normal state and the shorted state, the switching means, the drive force outputting means and the shorting means being arranged with respect to each other such that the first magnetic circuit produces a first torque that is exerted on the drive force outputting means and the second magnetic circuit produces a second torque that is exerted on the shorting means with the first and second torques being selectively controlled independently in order to independently control movement of the shorting means with respect to the drive force outputting means.

* * * * *